(12) United States Patent
Kurasawa et al.

(10) Patent No.: US 11,747,683 B2
(45) Date of Patent: Sep. 5, 2023

(54) DISPLAY DEVICE

(71) Applicant: Japan Display Inc., Tokyo (JP)

(72) Inventors: Hayato Kurasawa, Tokyo (JP); Hiroshi Mizuhashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 47 days.

(21) Appl. No.: 17/584,637

(22) Filed: Jan. 26, 2022

(65) Prior Publication Data

US 2022/0146892 A1     May 12, 2022

Related U.S. Application Data

(63) Continuation of application No. 17/023,943, filed on Sep. 17, 2020, now Pat. No. 11,269,226, which is a (Continued)

(30) Foreign Application Priority Data

Mar. 21, 2017    (JP) ................................. 2017-054896

(51) Int. Cl.
     *G02F 1/1343*      (2006.01)
     *G02F 1/1333*      (2006.01)
                 (Continued)

(52) U.S. Cl.
     CPC ...... *G02F 1/134309* (2013.01); *G02F 1/1343* (2013.01); *G02F 1/13338* (2013.01);
                 (Continued)

(58) Field of Classification Search
     CPC ........... G02F 1/134309; G02F 1/13338; G02F 1/1343; G06F 3/0412; G06F 3/04164;
                 (Continued)

(56) References Cited

U.S. PATENT DOCUMENTS

2010/0085322 A1*   4/2010   Mamba ................. G06F 3/0418
                                                                 345/173
2011/0134076 A1    6/2011   Kida et al.
(Continued)

FOREIGN PATENT DOCUMENTS

JP         2014-199605 A    10/2014
WO      WO2015/059995      4/2015

OTHER PUBLICATIONS

Office Action issued in related Japanese Patent Application No. 2017-054896 dated Sep. 29, 2020 and English translation of same. 5 pages.

*Primary Examiner* — Mark W Regn
(74) *Attorney, Agent, or Firm* — K&L Gates LLP

(57) ABSTRACT

A display device includes a first substrate, a second substrate, a display functional layer, first electrodes, pixel electrodes, second electrodes, a drive circuit, and a conductive body. The second substrate faces the first substrate. The display functional layer is provided between the first substrate and the second substrate. The first electrodes are provided between the first substrate and the second substrate. The pixel electrodes face the first electrodes between the first substrate and the second substrate. The second electrodes overlap the first electrodes through the display functional layer. The drive circuit supplies drive signals to a pair of the first electrode, wherein the drive circuit supplies a first electric potential to one of the pair of first electrodes and supplies a drive signal having a second electric potential different from the first electric potential to the other of the pair of first electrodes simultaneously.

16 Claims, 27 Drawing Sheets

Related U.S. Application Data continuation of application No. 15/922,276, filed on Mar. 15, 2018, now Pat. No. 10,838,247.

(51) Int. Cl.
*G06F 3/041* (2006.01)
*G06F 3/044* (2006.01)

(52) U.S. Cl.
CPC ............ *G06F 3/044* (2013.01); *G06F 3/0412* (2013.01); *G06F 3/0445* (2019.05); *G06F 3/0446* (2019.05); *G06F 3/04164* (2019.05); *G06F 3/04166* (2019.05); *G06F 2203/04112* (2013.01)

(58) Field of Classification Search
CPC .... G06F 3/04166; G06F 3/044; G06F 3/0445; G06F 3/0446; G06F 2203/04112
See application file for complete search history.

(56) References Cited

U.S. PATENT DOCUMENTS

| | | |
|---|---|---|
| 2012/0044203 A1 | 2/2012 | Ishizaki |
| 2014/0118299 A1* | 5/2014 | Wang .................... G09G 3/3648 345/174 |
| 2014/0292709 A1 | 10/2014 | Mizuhashi et al. |
| 2016/0202789 A1* | 7/2016 | Kim ...................... G06F 3/0446 345/174 |
| 2016/0253030 A1 | 9/2016 | Tada et al. |
| 2017/0068386 A1 | 3/2017 | Lai |

\* cited by examiner

FIG.14

(TABLE 1)

| | Pd | Ptm(1) | Pd | Ptm(2) | Pd | Ptm(3) | Pd | Ptm(4) | Pd | Pts1 | Pd | Pts2 |
|---|---|---|---|---|---|---|---|---|---|---|---|---|
| COML1 | Vcomdc | Vcom(+) | Vcomdc | Vcom(+) | Vcomdc | Vcom(+) | Vcomdc | Vcom(+) | Vcomdc | Vs1 | Vcomdc | Vg2 |
| COMLd | Vcomdc | floating | Vcomdc | floating | Vcomdc | floating | Vcomdc | floating | Vcomdc | Vs1 | Vcomdc | Vg2 |
| COML2 | Vcomdc | Vcom(+) | Vcomdc | Vcom(+) | Vcomdc | Vcom(-) | Vcomdc | Vcom(-) | Vcomdc | Vs1 | Vcomdc | Vg2 |
| COMLd | Vcomdc | floating | Vcomdc | floating | Vcomdc | floating | Vcomdc | floating | Vcomdc | Vs1 | Vcomdc | Vg2 |
| COML3 | Vcomdc | Vcom(+) | Vcomdc | Vcom(-) | Vcomdc | Vcom(+) | Vcomdc | Vcom(-) | Vcomdc | Vs1 | Vcomdc | Vg2 |
| COMLd | Vcomdc | floating | Vcomdc | floating | Vcomdc | floating | Vcomdc | floating | Vcomdc | Vs1 | Vcomdc | Vg2 |
| COML4 | Vcomdc | Vcom(+) | Vcomdc | Vcom(-) | Vcomdc | Vcom(-) | Vcomdc | Vcom(+) | Vcomdc | Vs1 | Vcomdc | Vg2 |
| COMLd | Vcomdc | floating | Vcomdc | floating | Vcomdc | floating | Vcomdc | floating | Vcomdc | Vs1 | Vcomdc | Vg2 |
| COML5 | Vcomdc | Vcomdc | Vcomdc | Vcomdc | Vcomdc | Vcomdc | Vcomdc | Vcomdc | Vcomdc | Vs1 | Vcomdc | Vg2 |
| COMLd | Vcomdc | floating | Vcomdc | floating | Vcomdc | floating | Vcomdc | floating | Vcomdc | Vs1 | Vcomdc | Vg2 |
| COML6 | Vcomdc | Vcomdc | Vcomdc | Vcomdc | Vcomdc | Vcomdc | Vcomdc | Vcomdc | Vcomdc | Vs1 | Vcomdc | Vg2 |
| COMLd | Vcomdc | floating | Vcomdc | floating | Vcomdc | floating | Vcomdc | floating | Vcomdc | Vs1 | Vcomdc | Vg2 |
| COML7 | Vcomdc | Vcomdc | Vcomdc | Vcomdc | Vcomdc | Vcomdc | Vcomdc | Vcomdc | Vcomdc | Vs1 | Vcomdc | Vg2 |
| COMLd | Vcomdc | floating | Vcomdc | floating | Vcomdc | floating | Vcomdc | floating | Vcomdc | Vs1 | Vcomdc | Vg2 |
| COML8 | Vcomdc | Vcomdc | Vcomdc | Vcomdc | Vcomdc | Vcomdc | Vcomdc | Vcomdc | Vcomdc | Vs1 | Vcomdc | Vg2 |
| COMLd | Vcomdc | floating | Vcomdc | floating | Vcomdc | floating | Vcomdc | floating | Vcomdc | Vs1 | Vcomdc | Vg2 |

DISPLAY DEVICE

CROSS-REFERENCE TO RELATED APPLICATIONS

This application is a continuation of U.S. application Ser. No. 17/023,943, filed Sep. 17, 2020, which is a continuation of U.S. application Ser. No. 15/922,276, filed Mar. 15, 2018, now U.S. Pat. No. 10,838,247, issued on Nov. 17, 2020, which application claims priority from Japanese Application No. 2017-054896, filed on Mar. 21, 2017, the entire contents of which are incorporated by reference herein in its entirety.

BACKGROUND

1. Technical Field

The present disclosure relates to a display device.

2. Description of the Related Art

Touch detection devices capable of detecting an external proximity object, what are called touch panels, have recently been attracting attention. Touch panels are mounted on or integrated with a display device, such as a liquid crystal display device, and used as display devices with a touch detection function. The display device with a touch detection function described in Japanese Patent Application Laid-open Publication No. 2014-199605 performs touch detection by code division multiplex drive. Code division multiplex drive is a method for touch detection by selecting a plurality of drive electrodes simultaneously and supplying drive signals having different phases to the selected drive electrodes.

If the potential difference between the drive electrodes increases in touch detection, the intensity of an electric field generated between the drive electrodes increases. The electric field generated between the drive electrodes may possibly change the orientation of liquid crystal molecules included in a liquid crystal layer, thereby deteriorating a displayed image.

SUMMARY

A display device according to one aspect includes a first substrate, a second substrate facing the first substrate, a display functional layer provided between the first substrate and the second substrate, a plurality of first electrodes provided between the first substrate and the second substrate, a plurality of pixel electrodes facing the first electrodes between the first substrate and the second substrate, a plurality of second electrodes overlapping the first electrodes through the display functional layer, a drive circuit configured to supply drive signals to a pair of the first electrode, wherein the drive circuit supplies a first electric potential to one of the pair of first electrodes and supplies a second electric potential different from the first electric potential to the other of the pair of first electrodes simultaneously, and a conductive body provided between the pair of first electrodes in planar view and configured to form an intermediate potential between the first electric potential and the second electric potential.

A display device according to one aspect includes a first substrate, a second substrate facing the first substrate, a display functional layer provided between the first substrate and the second substrate, a plurality of first electrodes provided between the first substrate and the second substrate, a plurality of pixel electrodes facing the first electrodes between the first substrate and the second substrate, and a conductive body provided between the first electrodes disposed side by side. The width of the conductive body is smaller than the width of the first electrode.

BRIEF DESCRIPTION OF THE DRAWINGS

FIG. 14 is a table of an exemplary operation performed by the display device according to the first embodiment;

DETAILED DESCRIPTION

Figure 1:
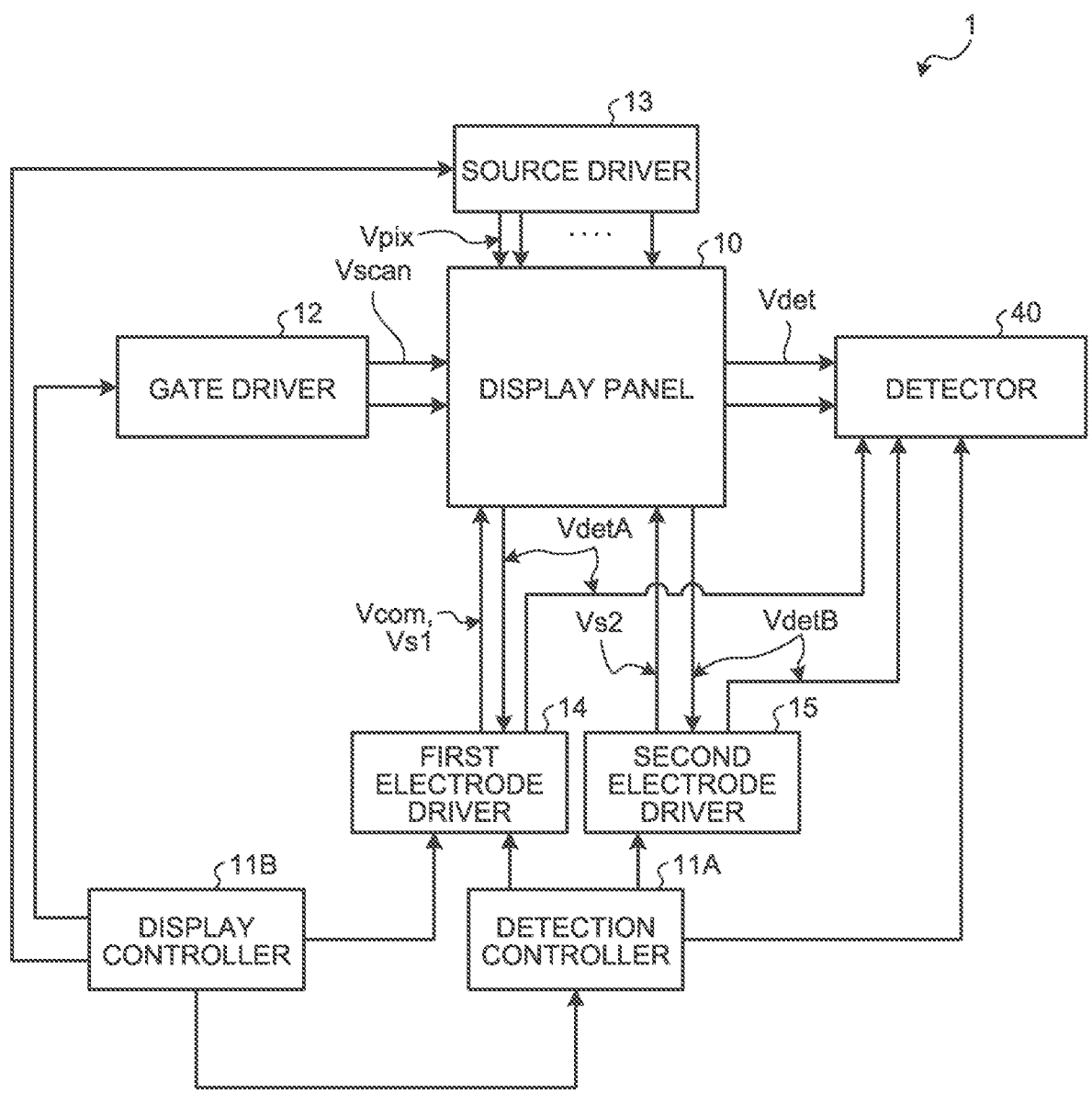
FIG. 1 is a block diagram of an exemplary configuration of a display device according to a first embodiment of the present disclosure.

Exemplary aspects (embodiments) to embody the present disclosure are described below in greater detail with reference to the accompanying drawings. The contents described in the embodiments are not intended to limit the present disclosure. Components described below include components easily conceivable by those skilled in the art and components substantially identical therewith. Furthermore, the components described below may be appropriately combined. What is disclosed herein is given by way of example only, and appropriate modifications made without departing from the spirit of the disclosure and easily conceivable by those skilled in the art naturally fall within the scope of the disclosure. To simplify the explanation, the drawings may possibly illustrate the width, the thickness, the shape, and other elements of each unit more schematically than the actual aspect. These elements, however, are given by way of example only and are not intended to limit interpretation of the disclosure. In the present specification and the figures, components similar to those previously described with reference to previous figures are denoted by like reference numerals, and overlapping explanation thereof may be appropriately omitted.

First Embodiment

Figure 2:
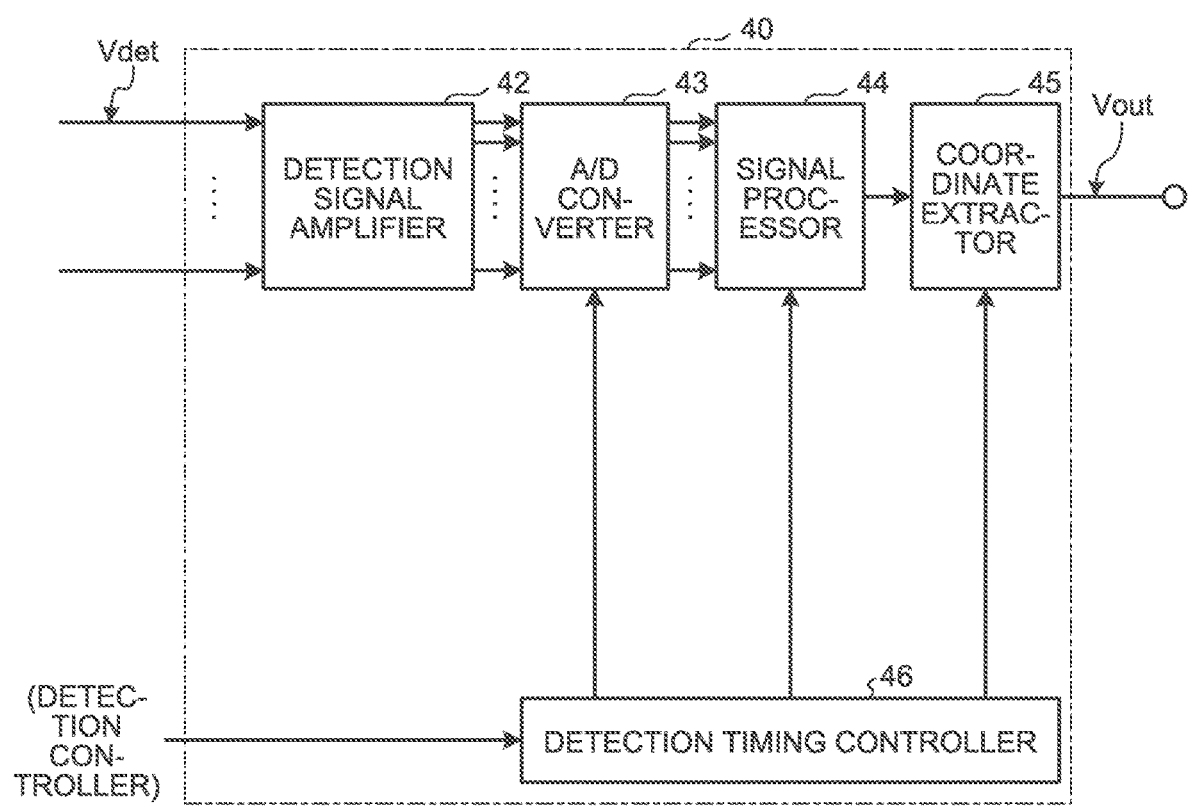
FIG. 2 is a block diagram of an exemplary configuration of a detector.

FIG. 1 is a block diagram of an exemplary configuration of a display device according to a first embodiment of the present disclosure. FIG. 2 is a block diagram of an exemplary configuration of a detector. A display device 1 according to the present embodiment has a detection function to detect contact and proximity of an object to be detected with and to a display surface. As illustrated in FIG. 1, the display device 1 includes a display panel 10, a detection controller 11A, a display controller 11B, a gate driver 12, a source driver 13, a first electrode driver 14, a second electrode driver 15, and a detector 40.

The display panel 10 includes a plurality of pixels including the display elements and has a display surface facing the pixels. The display panel 10 receives video signals to display an image composed of the pixels on the display surface.

The display controller 11B is a circuit that supplies control signals to the gate driver 12, the source driver 13, and the first electrode driver 14 based on video signals supplied from the outside to mainly control a display operation. The display controller 11B also supplies control signals to the detection controller 11A, thereby controlling the gate driver 12, the source driver 13, and the detection controller 11A such that they operate synchronously or asynchronously with one another.

The gate driver 12 has a function to sequentially select one horizontal line to be a target of display drive in the display panel 10 based on control signals supplied from the display controller 11B.

The source driver 13 is a circuit that supplies pixel signals Vpix to respective sub-pixels SPix of the display panel 10 based on control signals supplied from the display controller 11B. The display controller 11B may generate the pixel signals Vpix and supply them to the source driver 13.

The first electrode driver 14 is a circuit that supplies display drive signals Vcomdc or detection drive signals Vcom to the first electrodes COML of the display panel 10 based on control signals supplied from the display controller 11B.

The detection controller 11A controls a detection operation for detecting an object to be detected, such as a finger of a user and a touch pen (hereinafter, simply referred to as an object to be detected), in the display panel 10. The display panel 10 has a function to detect the position of an object to be detected in contact with the display surface of the display panel 10 based on the basic principle of mutual capacitance touch detection, which will be described later. If the display panel 10 detects contact or proximity of an object to be detected, the display panel 10 outputs detection signals Vdet to the detector 40.

The display panel 10 may have a function to detect the position of an object to be detected based on the basic principle of self-capacitance touch detection. The first electrode driver 14 supplies drive signals Vs1 to first electrodes COML based on the control signals supplied from the detection controller 11A in self-capacitance touch detection. The second electrode driver 15 supplies drive signals Vs2 to second electrodes TDL based on the control signals supplied from the detection controller 11A in self-capacitance touch detection.

The detector 40 is a circuit that determines whether a touch is made by an object to be detected on the display surface of the display panel 10 based on the control signals supplied from the detection controller 11A and on the detection signals Vdet output from the display panel 10 in mutual capacitance touch detection. The detector 40 can also determine whether a touch is made on the display panel 10 based on the control signals supplied from the detection controller 11A, detection signals VdetA output from the display panel 10 via the first electrode driver 14, and detection signals VdetB output from the display panel 10 via the second electrode driver 15 in self-capacitance touch detection. If a touch is detected, the detector 40 calculates the coordinates at which the touch input is made, for example.

As illustrated in FIG. 2, the detector 40 includes a detection signal amplifier 42, an analog/digital (A/D) converter 43, a signal processor 44, a coordinate extractor 45, and a detection timing controller 46. The detection timing controller 46 performs control such that the detection signal amplifier 42, the A/D converter 43, the signal processor 44, and the coordinate extractor 45 operate synchronously with one another based on the control signals supplied from the detection controller 11A.

The detection signal amplifier 42 amplifies the detection signals Vdet supplied from the display panel 10. The A/D converter 43 samples analog signals output from the detection signal amplifier 42 at a timing synchronized with the drive signals Vcom, thereby converting the analog signals into digital signals.

The signal processor 44 is a logic circuit that determines whether a touch is made on the display panel 10 based on the output signals from the A/D converter 43. The signal processor 44 performs processing of extracting a signal (absolute value $|\Delta V|$) of the difference between the detection signals caused by an object to be detected. The signal processor 44 compares the absolute value |ΔV| with a predetermined threshold voltage. If the absolute value |ΔV| is lower than the threshold voltage, the signal processor 44 determines that the object to be detected is in the non-contact state. By contrast, if the absolute value |ΔV| is equal to or higher than the threshold voltage, the signal processor 44 determines that the object to be detected is in the contact state or a proximity state. The detector 40 thus can perform touch detection.

In the present specification, a "contact state" includes a state where an object to be detected is in contact with the display surface or in proximity to the display surface close enough to consider it in contact therewith. A "non-contact state" includes a state where a finger is neither in contact with the display surface nor in proximity to the display surface close enough to consider it in contact therewith.

The coordinate extractor 45 is a logic circuit that calculates, when the signal processor 44 detects a touch, the touch panel coordinates of the touch. The coordinate extractor 45 outputs the touch panel coordinates as output signals Vout. The coordinate extractor 45 may output the output signals Vout to the display controller 11B. The display controller 11B can perform a predetermined display operation or a predetermined detection operation based on the output signals Vout.

The detection signal amplifier 42, the A/D converter 43, the signal processor 44, the coordinate extractor 45, and the detection timing controller 46 of the detector 40 are provided to the display device 1. The configuration is not limited thereto, and all or part of the functions of the detector 40 may be provided to an external processor, for example. The coordinate extractor 45, for example, may be provided to an external processor separately from the display device 1. The detector 40 may output the signals processed by the signal processor 44 as output signals Vout.

Figure 3:
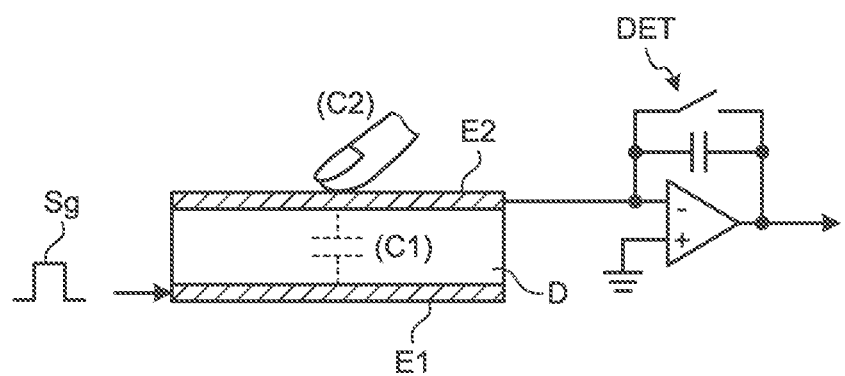
FIG. 3 is a diagram for explaining the basic principle of mutual capacitance touch detection.

The display panel 10 performs touch control based on the basic principle of capacitance touch detection. The following describes the basic principle of mutual capacitance touch detection performed by the display panel 10 according to the present embodiment. FIG. 3 is a diagram for explaining the basic principle of mutual capacitance touch detection. FIG. 3 also illustrates a detection circuit. While the following describes a case where a finger serving as an object to be detected is in contact with or in proximity to a detection electrode, the object to be detected is not limited to a finger and may be an object including a conductor, such as a stylus.

As illustrated in FIG. 3, for example, a capacitance element C1 includes a pair of electrodes, that is, a drive electrode E1 and a detection electrode E2 facing each other with a dielectric D interposed therebetween. The capacitance element C1 generates fringe lines of electric force extending from ends of the drive electrode E1 to the upper surface of the detection electrode E2 besides lines of electric force (not illustrated) formed between the facing surfaces of the drive electrode E1 and the detection electrode E2. A first end of the capacitance element C1 is coupled to an alternating-current (AC) signal source (drive signal source), and a second end thereof is coupled to a voltage detector DET. The voltage detector DET is an integration circuit included in the detector 40 illustrated in FIG. 1, for example.

The AC signal source applies an AC rectangular wave Sg at a predetermined frequency (e.g., a frequency of the order of several kilohertz to several hundred kilohertz) to the drive electrode E1 (first end of the capacitance element C1). An electric current depending on the capacitance value of the capacitance element C1 flows through the voltage detector DET. The voltage detector DET converts fluctuations in the electric current depending on the AC rectangular wave Sg into fluctuations in the voltage.

In the contact state, capacitance C2 generated by the finger is in contact with the detection electrode E2 or in proximity to the detection electrode E2 close enough to consider it in contact therewith as illustrated in FIG. 3. The fringe lines of electric force between the drive electrode E1 and the detection electrode E2 are blocked by a conductor (finger). As a result, the capacitance element C1 acts as a capacitance element having a capacitance value smaller than that in the non-contact state.

The amplitude of the voltage signal output from the voltage detector DET in the contact state is smaller than that in the non-contact state. The absolute value |ΔV| of the voltage difference varies depending on an effect of an object to be detected in contact with or in proximity to the detection electrode. As described above, the detector 40 compares the absolute value |ΔV| with the predetermined threshold voltage, thereby determining whether an object to be detected is in the non-contact state or the contact or proximity state. The detector 40 thus can perform touch detection based on the basic principle of mutual capacitance touch detection.

Figure 4:
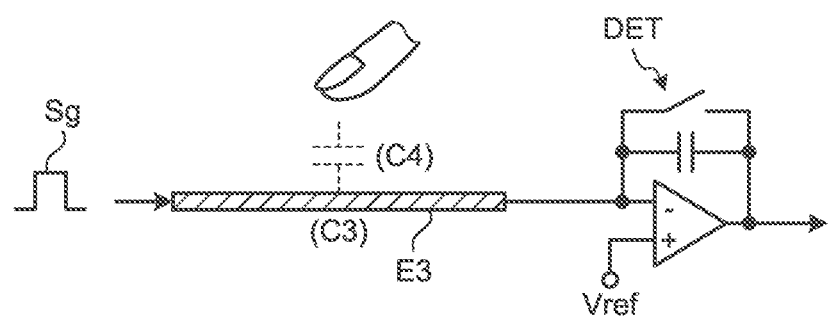
FIG. 4 is a diagram for explaining the basic principle of self-capacitance touch detection.

The following describes the basic principle of self-capacitance touch detection performed by the display panel 10 according to the present embodiment. FIG. 4 is a diagram for explaining the basic principle of self-capacitance touch detection. FIG. 4 also illustrates a detection circuit.

In the non-contact state, an AC rectangular wave Sg at a predetermined frequency (e.g., several kilohertz to several hundred kilohertz) is applied to a detection electrode E3. The detection electrode E3 has capacitance C3, and an electric current depending on the capacitance C3 flows. The voltage detector DET converts fluctuations in the electric current depending on the AC rectangular wave Sg into fluctuations in the voltage.

As illustrated in FIG. 4, in the contact state, capacitance C4 between the finger and the detection electrode E3 is added to the capacitance C3 of the detection electrode E3. In the contact state, the detection electrode E3 acts as a capacitance element having a capacitance value larger than that in the non-contact state. When the AC rectangular wave Sg is applied to the detection electrode E3, an electric current depending on the capacitance C3 and the capacitance C4 flows. The voltage detector DET converts fluctuations in the electric current depending on the AC rectangular wave Sg into fluctuations in the voltage. The amplitude of the voltage signal output from the voltage detector DET in the contact state is larger than that in the non-contact state. The detector 40 detects contact of the finger based on the absolute value |ΔV| of the voltage difference.

Figure 5:
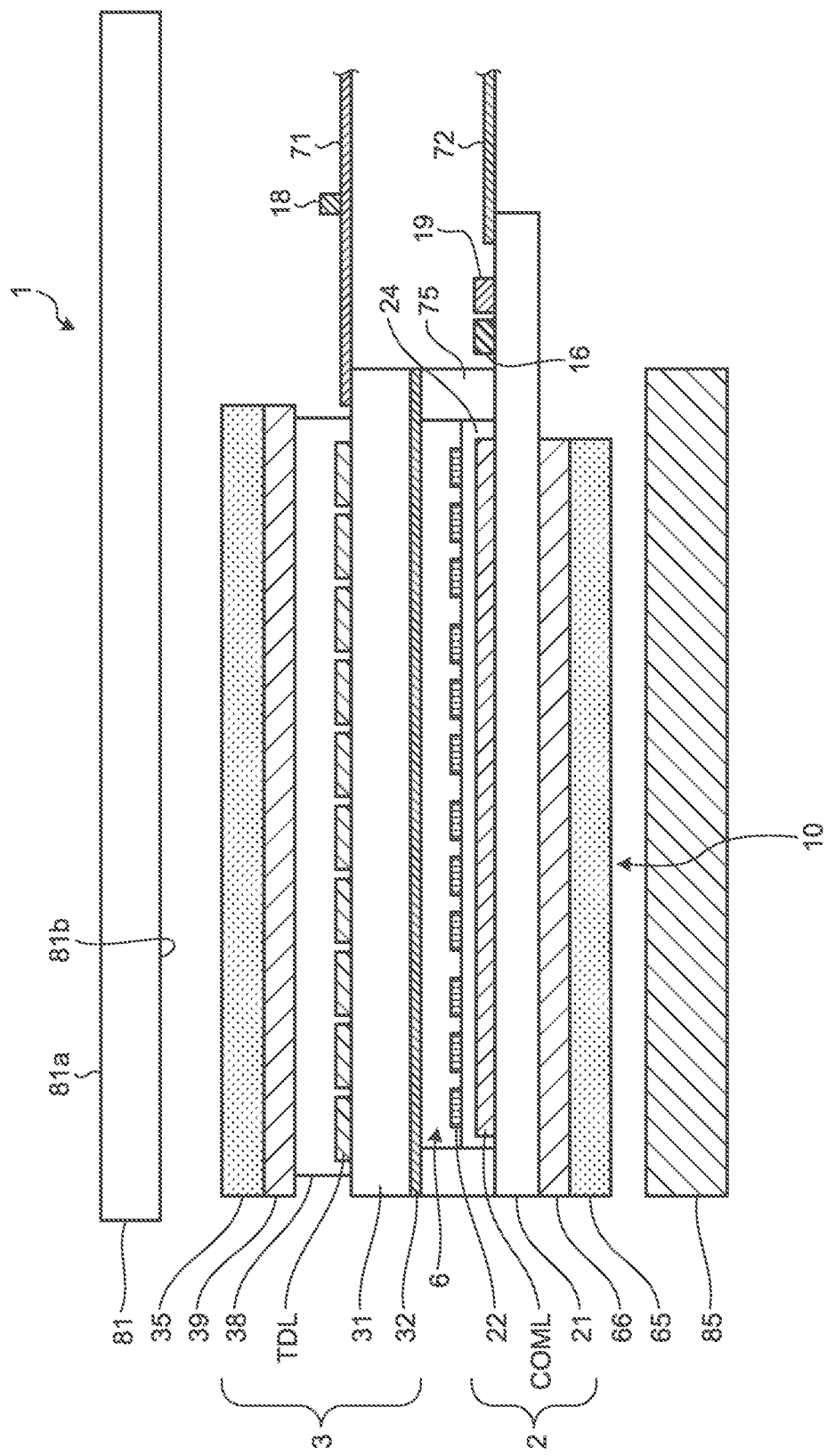
FIG. 5 is a sectional view of a schematic sectional structure of the display device according to the first embodiment.

The following describes an exemplary configuration of the display device 1 according to the present embodiment in greater detail. FIG. 5 is a sectional view of a schematic sectional structure of the display device according to the first embodiment. As illustrated in FIG. 5, the display device 1 includes the display panel 10, a backlight unit 85, a cover panel 81, a drive integrated circuit (IC) 19, a touch IC 18, and flexible substrates 71 and 72. The drive IC 19 and the touch IC 18 are coupled on the flexible substrate 72.

The display panel 10 includes an array substrate 2, a counter substrate 3, a liquid crystal layer 6 serving as a display functional layer, and a pair of upper and lower polarization plates 35 and 65. The counter substrate 3 is disposed facing the array substrate 2 in a direction perpendicular to the surface of the array substrate 2. The liquid crystal layer 6 is provided between the array substrate 2 and the counter substrate 3.

The array substrate 2 is provided with a plurality of gate lines GCL (refer to FIG. 7) and a plurality of signal lines SGL (refer to FIG. 7) intersecting the gate lines GCL. The gate lines GCL and the signal lines SGL divide a display area Ad (refer to FIG. 6) into a matrix (row-column configuration). One divided area is referred to as a (sub-) pixel area. The pixel areas are each provided with a thin-film transistor (TFT) switch and a pixel electrode 22. The pixel electrodes 22 are coupled to the respective TFT switches. A first substrate 21 is provided with the first electrodes COML. The first electrode COML has a width across a plurality of pixels and has a long side extending along the signal lines SGL.

The array substrate 2 has a gate driver circuit. The gate driver circuit is provided between the gate lines GCL and the drive IC 19 and sequentially supplies drive signals to the gate lines GCL based on input of gate drive signals from the drive IC 19. The first electrode driver 14 (common driver) and the source driver 13 are included in the drive IC 19. A multiplexer 16 is provided between the signal lines SGL and the drive IC 19. The multiplexer 16 changes the coupling state between the signal lines SGL and the drive IC 19. The first electrode driver 14 (common driver) may be provided to another IC different from the drive IC 19 or included in the array substrate, for example.

The pixel electrodes 22 are supplied with the pixel signals Vpix for performing a display operation from the drive IC 19 via the multiplexer 16. The first electrodes COML are supplied with the direct-current (DC) display drive signals Vcomdc via the drive IC 19 to serve as common electrodes for the pixel electrodes 22 in a display operation. In the present specification, "above" indicates a direction from a first substrate 21 toward a second substrate 31 in a direction perpendicular to the first substrate 21. "Planar view" indicates a view seen in the direction perpendicular to the surface of the first substrate 21.

The pixel electrodes 22 and the first electrodes COML according to the present embodiment are made of a translucent conductive material, such as indium tin oxide (ITO).

The array of the pixel electrodes 22 is not limited to a matrix array in which the pixel electrodes 22 are arrayed in a first direction and a second direction orthogonal to the first direction. Alternatively, adjacent pixel electrodes 22 may be disposed deviating in the first direction or the second direction. Still alternatively, adjacent pixel electrodes 22 may have different sizes, and two or three pixel electrodes 22 may be disposed on one side of one pixel electrode 22 included in a pixel column arrayed in the first direction.

The counter substrate 3 includes the second substrate 31, a color filter 32, the second electrodes TDL, and an insulating layer 38. The color filter 32 is provided on a first surface of the second substrate 31. The second electrodes TDL are provided on a second surface of the second substrate 31. An adhesive layer 39 and the polarization plate 35 are provided on the second electrodes TDL with the insulating layer 38 interposed therebetween. The second electrodes TDL serve as detection electrodes of the display panel 10. The color filter 32 faces the liquid crystal layer 6 in the direction perpendicular to the first substrate 21. The color filter 32 may be disposed on the first substrate 21. The first substrate 21 and the second substrate 31 according to the present embodiment are glass substrates or resin substrates, for example.

The first substrate 21 and the second substrate 31 are disposed facing each other with a predetermined space interposed therebetween. The space between the first substrate 21 and the second substrate 31 is sealed with a sealing portion 75. The liquid crystal layer 6 is provided between the first substrate 21 and the second substrate 31. The liquid crystal layer 6 modulates light passing therethrough depending on the state of an electric field. The liquid crystal layer 6, for example, includes liquid crystals in a lateral electric-field mode, such as the in-plane switching (IPS) mode including the fringe field switching (FFS) mode. An orientation film (not illustrated) is provided between the liquid crystal layer 6 and the array substrate 2 and between the liquid crystal layer 6 and the counter substrate 3 illustrated in FIG. 5.

The backlight unit 85 is provided below the first substrate 21. The backlight unit 85 includes a light source, such as light emitting diodes (LED), and outputs light from the light source to the first substrate 21. The light from the backlight unit 85 passes through the array substrate 2. The light is modulated depending on the state of the liquid crystals at the corresponding position, whereby the state of transmission of light to the display surface varies depending on the positions. As a result, an image is displayed on the display surface.

The cover panel 81 is provided above the polarization plate 35. The cover panel 81 is a protective member that covers and protects the array substrate 2 and the counter substrate 3. The cover panel 81 may be a glass substrate or a film substrate made of a resin material, for example. The cover panel 81 has a first surface 81a and a second surface 81b opposite to the first surface 81a. The first surface 81a of the cover panel 81 serves as a display surface on which an image is displayed and a detection surface with or to which an object to be detected is in contact or in proximity. Touch detection according to the present embodiment includes detection of an object to be detected directly in contact with the first surface 81a. Touch detection also includes detection of an object to be detected in contact with a protective film (not illustrated) provided to the first surface 81a, for example. The second surface 81b of the cover panel 81 faces the counter substrate 3 and is bonded to the counter substrate 3 with an adhesive layer, which is not illustrated, interposed therebetween.

Figure 6:
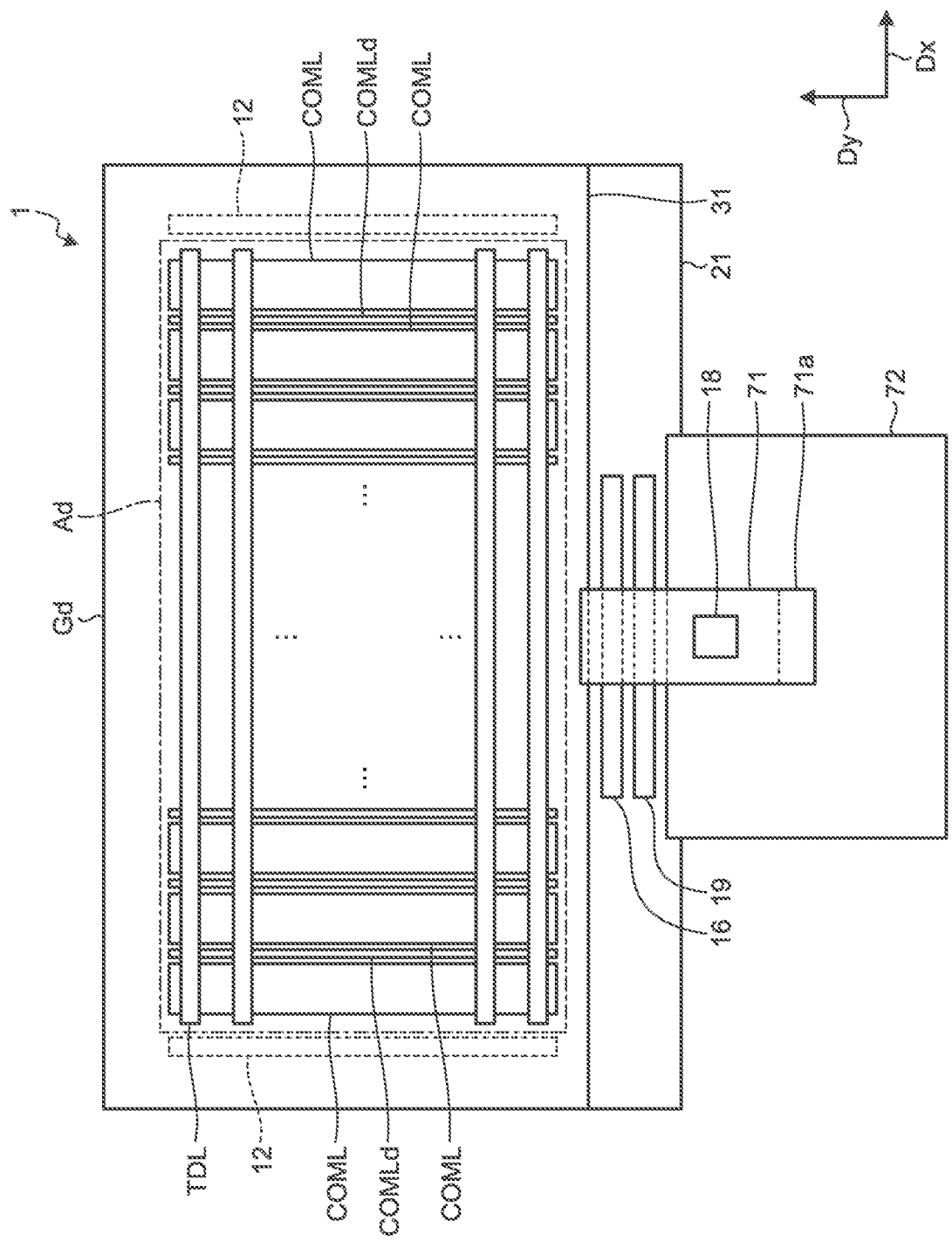
FIG. 6 is a plan view schematically illustrating the relation between first electrodes, second electrodes, and third electrodes.

FIG. 6 is a plan view schematically illustrating the relation between the first electrodes, the second electrodes, and third electrodes. As illustrated in FIG. 6, the display device 1 has a frame-shaped frame area Gd on the outer side of the rectangular display area Ad. In the present specification, the display area Ad is an area for displaying an image and overlapped with a plurality of pixels Pix (sub-pixels SPix). As illustrated in FIG. 6, a first direction Dx according to the present embodiment indicates the direction along the long side of the display area Ad, and a second direction Dy indicates the direction intersecting the first direction Dx.

As illustrated in FIG. 6, the first electrodes COML and third electrodes COMLd are provided in the display area Ad of the first substrate 21. The first electrodes COML have long sides extending in the second direction Dy and are arrayed in the first direction Dx. The third electrodes COMLd have long sides extending in the second direction Dy and are arrayed in the first direction Dx. In the example illustrated in FIG. 6, the first electrodes COML and the third electrodes COMLd are alternately disposed with a space interposed therebetween. Both of the first electrodes COML and the third electrodes COMLd have a strip shape. The width of the third electrodes COMLd is smaller than that of the first electrodes COML.

The second electrodes TDL are provided in the display area Ad of the second substrate 31. The second electrodes TDL extend in the first direction Dx and are arrayed in the second direction Dy. In other words, the second electrodes TDL intersect the first electrodes COML in planar view. Capacitance is formed at the intersections or peripheral portions of the first electrodes COML and the second electrodes TDL. Similarly to the first electrodes COML, the second electrodes TDL are made of a translucent conductive material, such as ITO. The second electrodes TDL may be made of a metal material including at least one of aluminum (Al), copper (Cu), silver (Ag), molybdenum (Mo), and an alloy of these metals. In this case, the second electrodes TDL include a plurality of metal thin wires with a width of several micrometers to ten-odd micrometers having a zigzag line shape, a wavy line shape, or a mesh shape.

As illustrated in FIGS. 5 and 6, the flexible substrate 72 is coupled to the frame area Gd of the first substrate 21. The flexible substrate 71 is coupled to the frame area Gd of the second substrate 31. The flexible substrate 71 is electrically coupled to the flexible substrate 72 via a coupler 71a. The flexible substrate 71 is provided with the touch IC 18 that controls a detection operation performed by the display panel 10. The frame area Gd of the first substrate 21 is provided with the drive IC 19 that controls a display operation performed by the display panel 10.

Various kinds of circuits, such as the source driver 13 and the first electrode driver 14 illustrated in FIG. 1, are provided to the drive IC 19. The multiplexer 16 is provided between the drive IC 19 and the display area Ad. The gate drivers 12 are disposed along a pair of short sides of the display area Ad. The gate driver 12 may be disposed on only one of the short sides of the display area Ad.

With this configuration, to perform mutual capacitance touch detection, the first electrode driver 14 sequentially scans the first electrodes COML and supplies the drive signals Vcom thereto in a time-division manner. In this case, the first electrode driver 14 may simultaneously select a drive electrode block Bkn including a plurality of first electrodes COML and sequentially supply the drive signals Vcom to each drive electrode block Bkn. The second electrodes TDL output the detection signals Vdet corresponding to the changes in capacitance between the first electrodes COML and the second electrodes TDL. The display device 1 thus detects a touch made by an object to be detected. In other words, the first electrodes COML correspond to the drive electrode E1 in the basic principle of mutual capacitance touch detection described above, and the second electrodes TDL correspond to the detection electrode E2.

Figure 7:
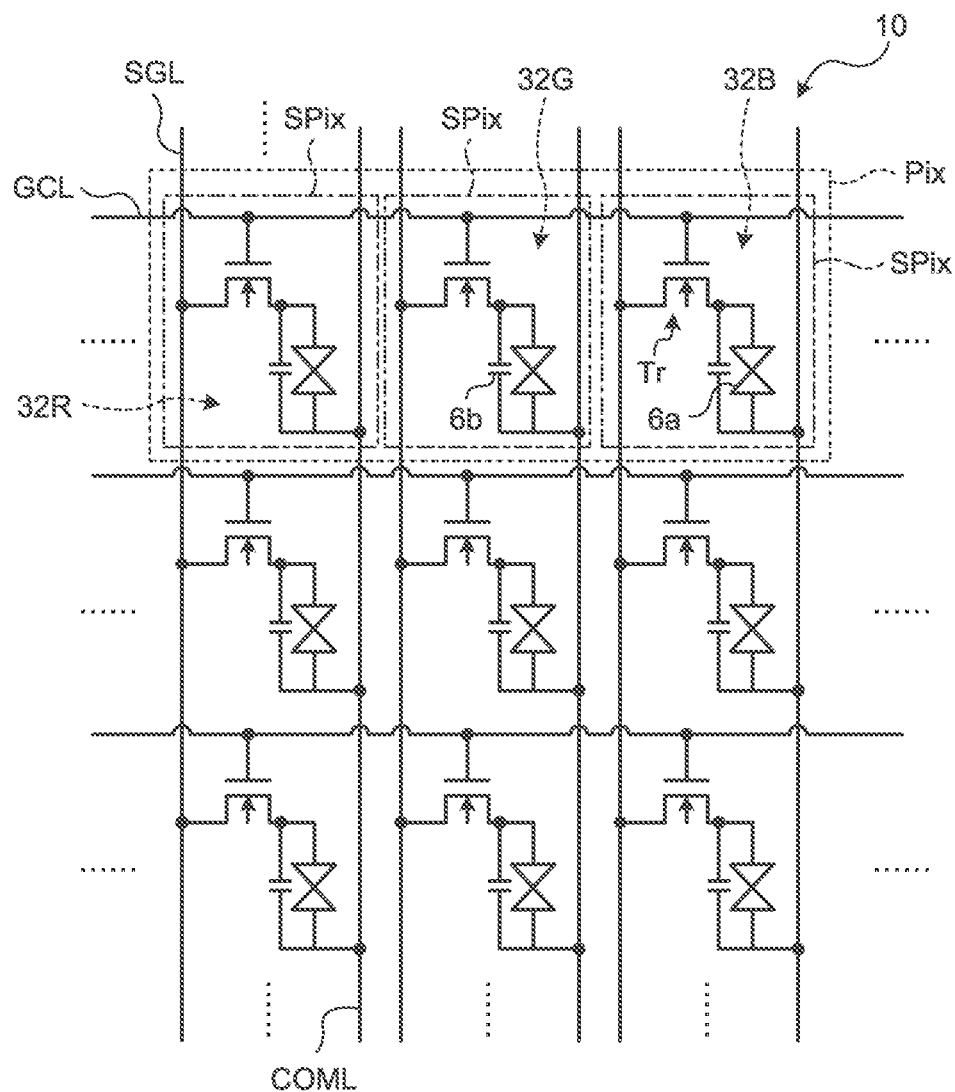
FIG. 7 is a circuit diagram of a pixel array in a display panel according to the first embodiment.

The following describes a display operation performed by the display panel 10. FIG. 7 is a circuit diagram of a pixel array in the display panel according to the first embodiment. The first substrate 21 (refer to FIG. 5) is provided with switching elements Tr of the respective sub-pixels SPix, and wiring such as the signal lines SGL and the gate lines GCL as illustrated in FIG. 7. The data lines SGL are wiring that supplies the pixel signals Vpix to the pixel electrodes 22. The gate lines GCL are wiring that supplies drive signals for driving the switching elements Tr. The signal lines SGL and the gate lines GCL extend on a plane parallel to the surface of the first substrate 21.

The display panel 10 illustrated in FIG. 7 includes a plurality of sub-pixels SPix arrayed in a matrix (row-column configuration). The sub-pixels SPix each include the switching element Tr and a liquid crystal element 6a. The switching element Tr is a thin-film transistor and is an n-channel metal oxide semiconductor (MOS) TFT in this example. An insulating layer 24 is provided between the pixel electrodes 22 and the common electrodes (first electrodes COML) to form holding capacitance 6b illustrated in FIG. 7.

The gate driver 12 illustrated in FIG. 1 sequentially selects the gate line GCL. The gate driver 12 applies scanning signals Vscan to the gates of the switching elements Tr of the respective sub-pixels SPix via the selected gate line GCL. As a result, one row (one horizontal line) out of the sub-pixels SPix is sequentially selected as a target of display drive. The source driver 13 supplies the pixel signals Vpix to the sub-pixels SPix included in the selected horizontal line via the signal lines SGL. The sub-pixels SPix perform display on each horizontal line based on the supplied pixel signals Vpix.

To perform the display operation, the first electrode driver 14 applies the display drive signals Vcomdc to the first electrodes COML. As a result, the first electrodes COML serve as common electrodes for the pixel electrodes 22 in the display operation. The first electrodes COML according to the present embodiment extend along the signal lines SGL and intersect with the gate lines GCL. The configuration is not limited thereto, and the first electrodes COML may intersect the signal lines SGL, for example.

Wiring extending from the first electrodes COML can be led toward the flexible substrate 72 on the frame area Gd because the first electrodes COML extend along the signal lines SGL (refer to FIG. 6). With this configuration, the first electrode driver 14 need not be provided at a position on the short side of the frame area Gd along the first electrodes COML unlike the configuration in which the first electrodes COML intersect the signal lines SGL. Consequently, this configuration can make the frame area Gd narrower.

The color filter 32 illustrated in FIG. 5 may include periodically arrayed color areas in three colors of red (R), green (G), and blue (B), for example. The color areas 32R, 32G, and 32B of the three colors of R, G, and B, respectively, serve as a set and correspond to the respective sub-pixels SPix illustrated in FIG. 7. A set of sub-pixels SPix corresponding to the respective color areas 32R, 32G, and 32B of the three colors constitutes a pixel Pix. The color filter 32 may include color areas of four or more colors.

Code Division Multiplex Drive

Figure 8:
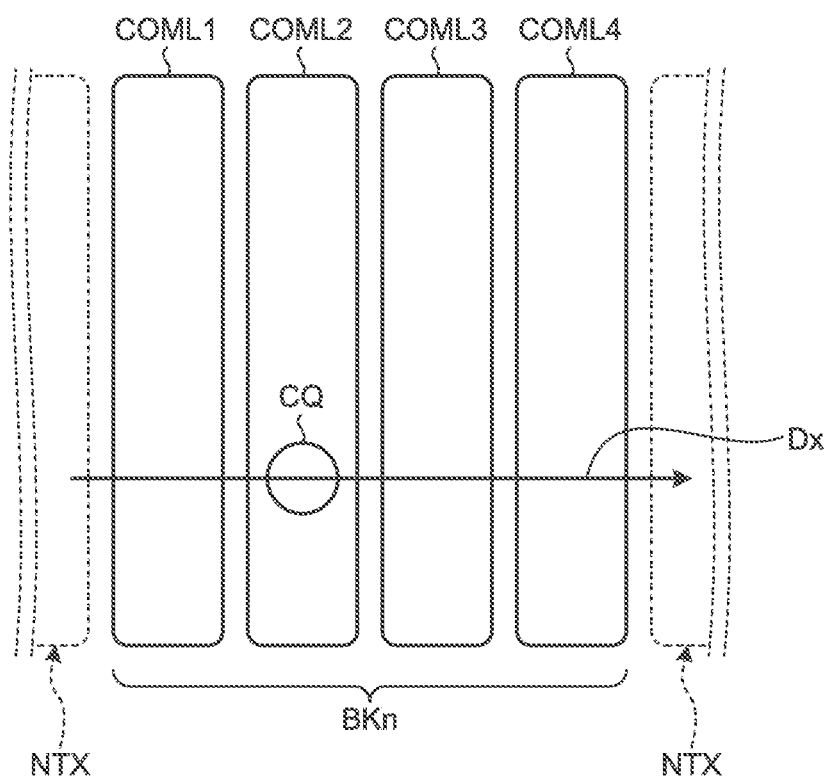
FIG. 8 is a diagram of the first electrodes used for explanation of an exemplary operation in CDM drive.
Figure 9:
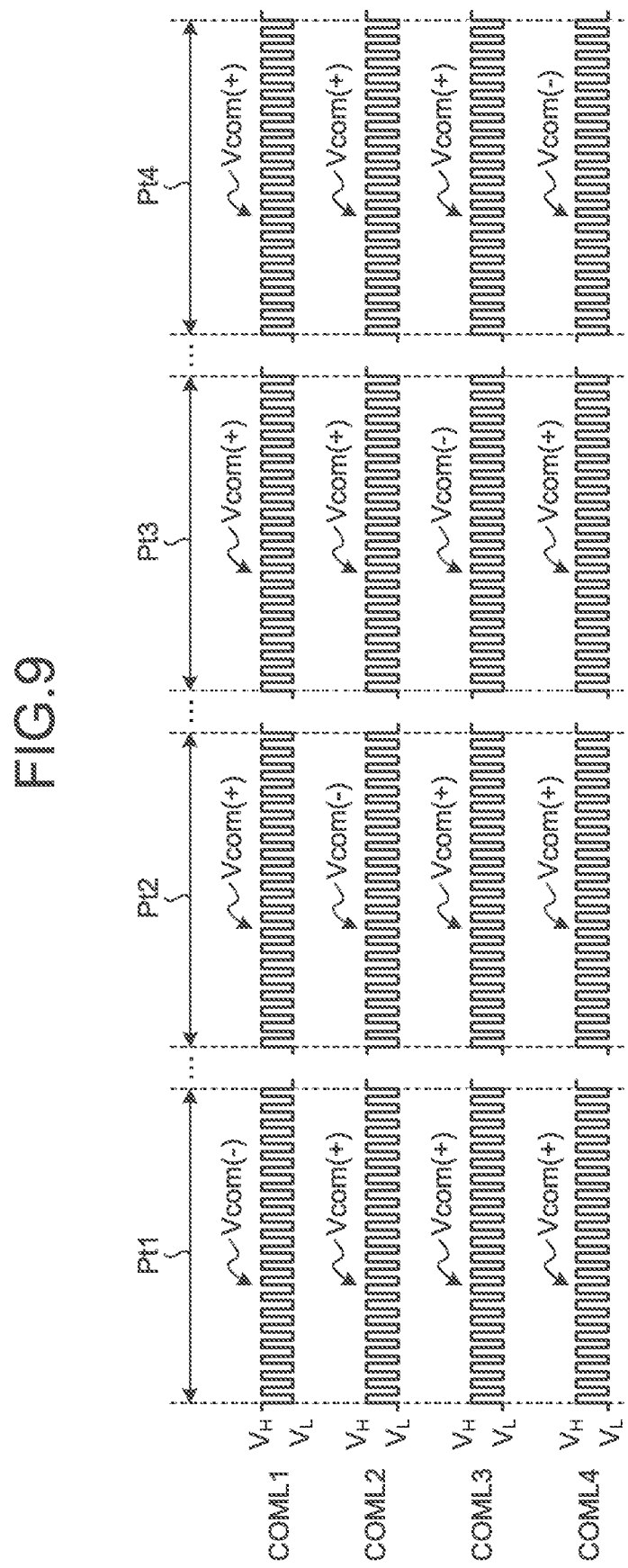
FIG. 9 is a timing waveform chart of drive signals used for explanation of an exemplary operation in CDM drive.
Figure 10:
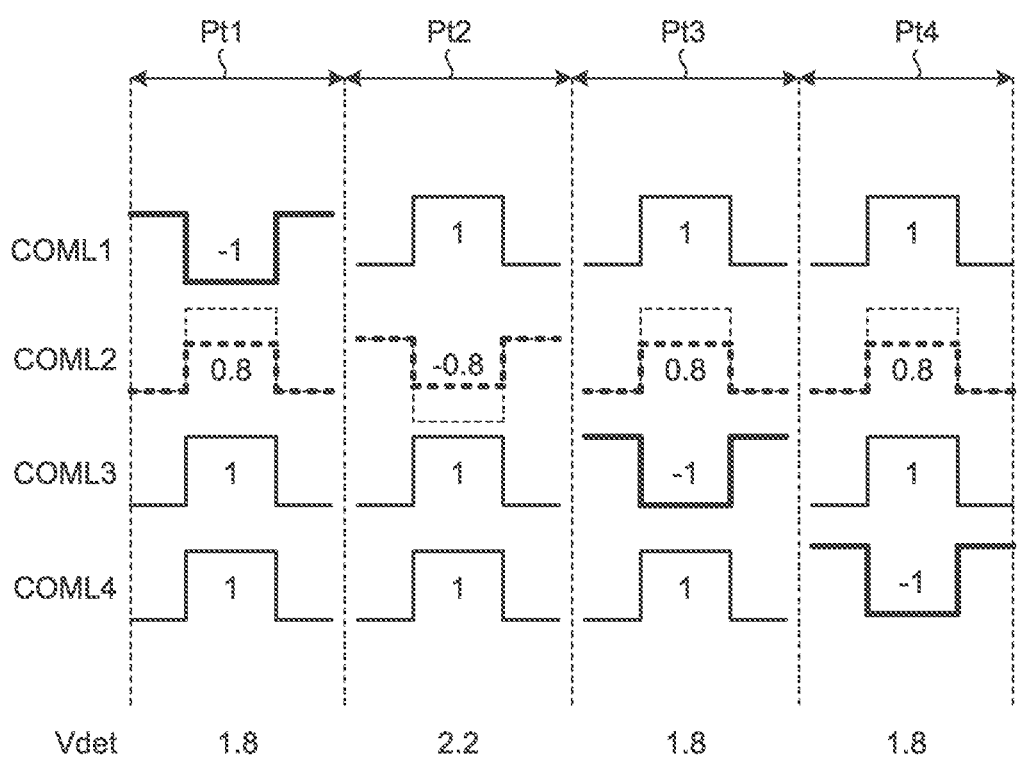
FIG. 10 is a diagram of detection signals used for explanation of an exemplary operation in CDM drive.

The following describes touch detection by code division multiplex (CDM) drive (hereinafter, referred to as CDM drive) as an example of a detection operation according to the present embodiment. FIG. 8 is a diagram of the first electrodes used for explanation of an exemplary operation in CDM drive. FIG. 9 is a timing waveform chart of drive signals used for explanation of an exemplary operation in CDM drive. FIG. 10 is a diagram of detection signals used for explanation of an exemplary operation in CDM drive.

As illustrated in FIG. 8, the first electrode driver 14 selects the drive electrode block Bkn out of a plurality of first electrodes COML. The drive electrode block Bkn includes four first electrodes COML1, COML2, COML3, and COML4. In the following description, the first electrodes COML1, COML2, COML3, and COML4 are referred to as the first electrodes COML when they need not be distinguished from one another. The first electrodes COML not included in the drive electrode block Bkn are included in a non-selected block NTX. The non-selected block NTX includes the first electrodes COML not selected by the first electrode driver 14. The first electrode driver 14 sequentially selects the drive electrode block Bkn of every four first electrodes COML in the first direction Dx. To simplify the explanation, the third electrodes COMLd are not illustrated in FIG. 8. The drive electrode block Bkn may include five or more first electrodes COML. Alternatively, the first electrode driver 14 may simultaneously select all the first electrodes COML in the display area Ad.

The first electrode driver 14 supplies the detection drive signals Vcom having a phase determined based on a predetermined code to the four first electrodes COML1, COML2, COML3, and COML4. The predetermined code is defined by the square matrix in Expression (1) described below, for example.

The order of the square matrix is four corresponding to the number of the first electrodes COML1, COML2, COML3, and COML4 included in the drive electrode block Bkn. Diagonal elements "−1" of the square matrix in Expression (1) are different from elements "1" other than the diagonal elements in the square matrix. The code "−1" is a code for supplying the drive signals Vcom determined to have a phase different from that of the code "1". The drive signal corresponding to the code "1" is referred to as a drive signal Vcom(+), and the drive signal corresponding to the code "−1" is referred to as a drive signal Vcom(−).

As illustrated in FIG. 9, the drive signal Vcom(+) has the opposite phase to that of the drive signal Vcom(−). The drive signal Vcom(+) is an AC voltage signal in which a high level voltage $V_H$ and a low level voltage $V_L$ alternately appear. The drive signal Vcom(−) is synchronized with the drive signal Vcom(+) and has the same amplitude as that of the drive signal Vcom(+) but has a phase shifted by $\pi$.

The first electrode driver 14 supplies the drive signal Vcom(+) or the drive signal Vcom(−) corresponding to the first row of the square matrix in Expression (1) to the first electrodes COML in a first period Pt1. Specifically, the first electrode driver 14 supplies the drive signal Vcom(−) corresponding to the code "−1" to the first electrode COML1. The first electrode driver 14 supplies the drive signal Vcom(+) corresponding to the code "1" to the first electrodes COML2, COML3, and COML4.

The first electrode driver 14 supplies the drive signal Vcom(+) or the drive signal Vcom(−) corresponding to the second row of the square matrix in Expression (1) to the first electrodes COML in a second period Pt2. Specifically, the first electrode driver 14 supplies the drive signal Vcom(−) corresponding to the code "−1" to the first electrode COML2. The first electrode driver 14 supplies the drive signal Vcom(+) corresponding to the code "1" to the first electrodes COML1, COML3, and COML4.

Similarly, the first electrode driver 14 supplies the drive signal Vcom(+) or the drive signal Vcom(−) corresponding to the third row of the square matrix in Expression (1) to the first electrodes COML in a third period Pt3. The first electrode driver 14 supplies the drive signal Vcom(+) or the drive signal Vcom(−) corresponding to the fourth row of the square matrix in Expression (1) to the first electrodes COML in a fourth period Pt4.

FIG. 10 illustrates the detection signals Vdet output when an object to be detected CQ (refer to FIG. 8) is in contact with the first electrode COML2. FIG. 10 illustrates the detection signals Vdet on the assumption that the voltage of difference between the detection signal Vdet in the non-contact state and that in the contact state is 20%. To simplify the explanation, FIG. 10 illustrates the detection signals Vdet corresponding to the respective first electrodes COML1, COML2, COML3, and COML4. In the actual configuration, however, the second electrode TDL intersecting the first electrodes COML1, COML2, COML3, and COML4 outputs a signal obtained by totaling the detection signals Vdet as the detection signal Vdet.

As illustrated in FIG. 10, the first electrode COML1 is supplied with the drive signal Vcom(−) corresponding to the code "−1" in the first period Pt1. As a result, the phase of the detection signal Vdet of the first electrode COML1 is opposite to that of the other first electrodes COML2, COML3, and COML4. Consequently, the detection signal Vdet in the first period Pt1 is expressed by: (−1)+(0.8)+(1)+(1)=1.8. The value "1.8" indicates signal intensity that is based on the signal intensity of the drive signal Vcom(+) corresponding to the code "1".

Similarly, the detection signal Vdet in the second period Pt2 is expressed by: (1)+(−0.8)+(1)+(1)=2.2. The detection signal Vdet in the third period Pt3 is expressed by: (1)+(0.8)+(−1)+(1)=1.8. The detection signal Vdet in the fourth period Pt4 is expressed by: (1)+(0.8)+(1)+(−1)=1.8.

The coordinate extractor 45 performs decoding by multiplying the detection signals Vdet detected by the signal processor 44 by the square matrix in Expression (1). As a result, "4.0" is derived as a detection signal VdetD resulting from decoding corresponding to the first electrode COML1, "3.2" is derived as a detection signal VdetD resulting from decoding corresponding to the first electrode COML2, "4.0" is derived as a detection signal VdetD resulting from decoding corresponding to the first electrode COML3, and "4.0" is derived as a detection signal VdetD resulting from decoding corresponding to the first electrode COML4. The coordinate extractor 45 outputs the touch panel coordinates as the output signal Vout based on the detection signals VdetD resulting from decoding.

$$\begin{pmatrix} -1 & 1 & 1 & 1 \\ 1 & -1 & 1 & 1 \\ 1 & 1 & -1 & 1 \\ 1 & 1 & 1 & -1 \end{pmatrix} \begin{pmatrix} 1.8 \\ 2.2 \\ 1.8 \\ 1.8 \end{pmatrix} = \begin{pmatrix} 4.0 \\ 3.2 \\ 4.0 \\ 4.0 \end{pmatrix} \quad (1)$$

As described above, the voltage of difference between the detection signal Vdet in the contact state and that in the non-contact state increases from 0.2 (=1.0−0.8) to 0.8 (=4.0−3.2). Consequently, the detection sensitivity increases by four times. If a noise signal from the outside is detected, the magnitude of the noise signal resulting from decoding increases by the half power with respect to the detection signal Vdet. In other words, the magnitude of the noise signal resulting from decoding is twice ($=\sqrt{4}$) the magnitude prior to decoding in the example described above. As described above, the noise signal resulting from decoding is reduced compared with the detection signal Vdet, thereby increasing the signal-to-noise (S/N) ratio. By performing CDM drive, the display device 1 can detect the object to be detected CQ with detection sensitivity higher than that in a case where it performs time-division multiplex drive without raising the voltage of the drive signals Vcom.

The square matrix in Expression (1) is given by way of example only and may be another square matrix. The square matrix may be a square matrix M represented by Expression (2) described below, for example. These square matrices can be generated by a spread code, such as pseudorandom noise (PN) sequences. While one drive electrode block BKn includes four first electrodes COML in FIGS. 8 to 10 to simplify the explanation, the configuration is not limited thereto. If one drive electrode block BKn includes n first electrodes COML, for example, the order of the square matrix is n. The number of combinations of the first electrodes COML supplied with the drive signal Vcom(+) and those supplied with the drive signal Vcom(−) is n, which is equal to the order of the square matrix. The display device 1 can perform CDM drive based on the n combinations.

$$M = \begin{pmatrix} 1 & 1 & 1 & 1 \\ 1 & 1 & -1 & -1 \\ 1 & -1 & 1 & -1 \\ 1 & -1 & -1 & 1 \end{pmatrix} \quad (2)$$

In CDM drive, as illustrated in FIG. 9, adjacent first electrodes COML are supplied with the drive signal Vcom(+) and the drive signal Vcom(−) having different phases. As a result, the potential difference between the first electrodes COML increases. The potential difference may possibly become large enough to change the orientation direction of the liquid crystal molecules present between the first electrodes COML. In this case, a displayed image may possibly deteriorate in touch detection.

To address this, the present embodiment includes the third electrodes COMLd between the first electrodes COML1, COML2, COML3, and COML4 arrayed in the first direction Dx.

Figure 11:
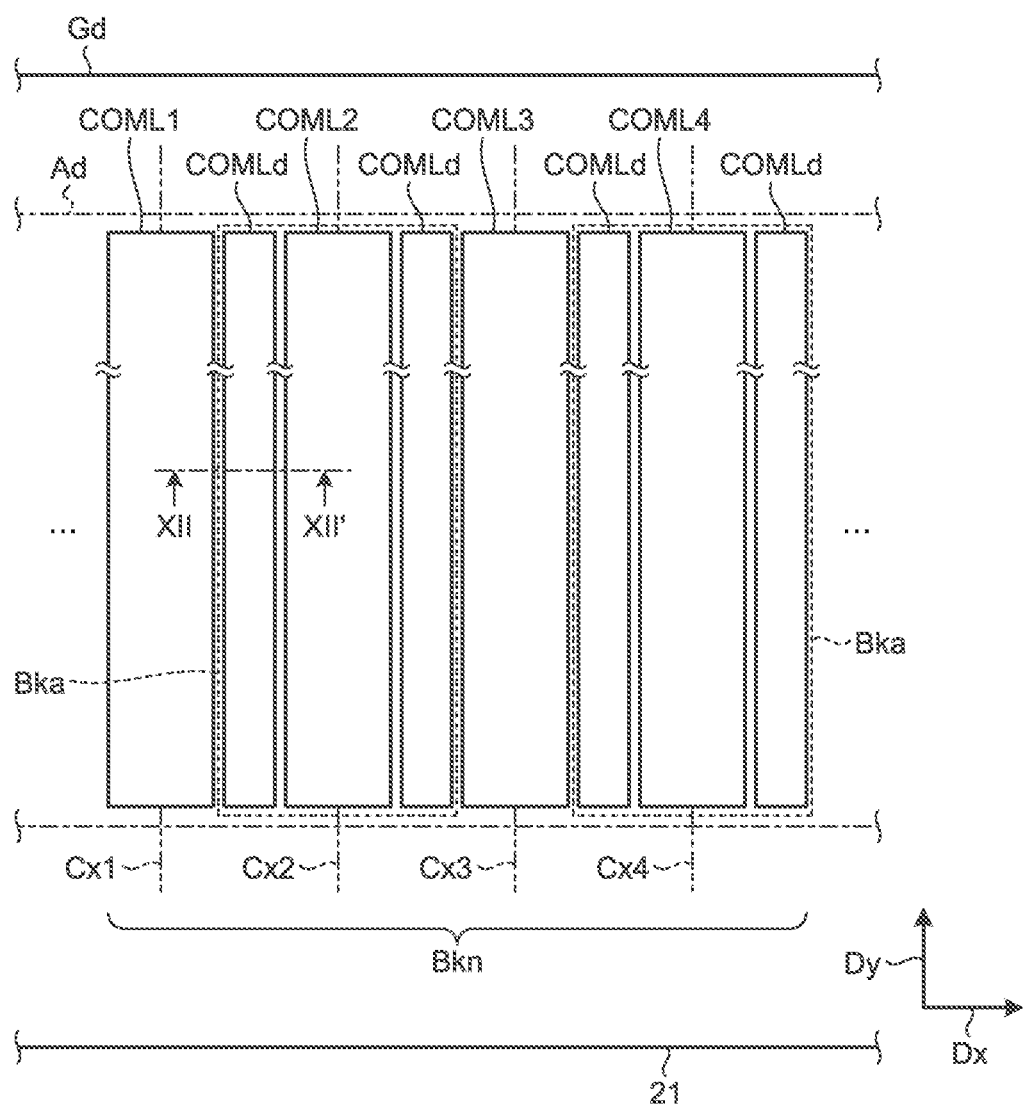
FIG. 11 is a plan view of the first electrodes and the third electrodes according to the first embodiment.
Figure 12:
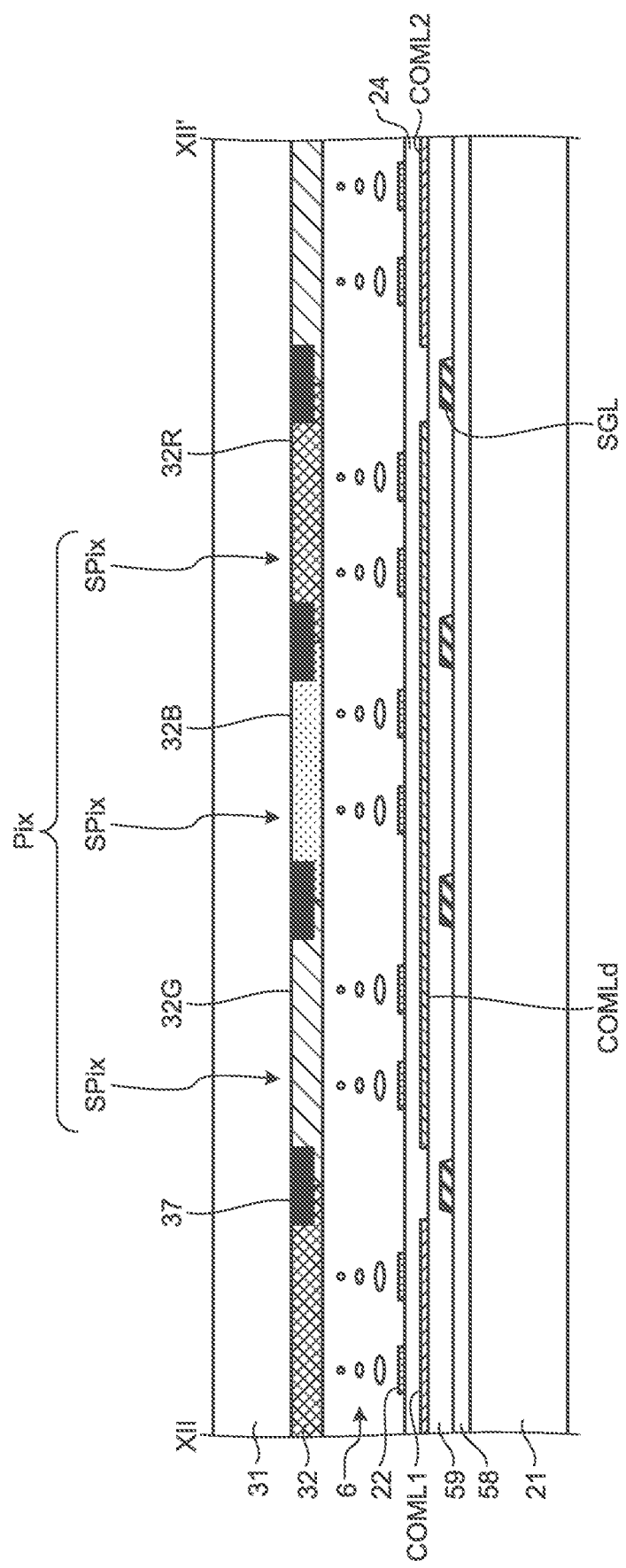
FIG. 12 is a sectional view along line XII-XII' in FIG. 11.

FIG. 11 is a plan view of the first electrodes and the third electrodes according to the first embodiment. FIG. 12 is a sectional view along line XII-XII' in FIG. 11. As illustrated in FIG. 12, the third electrodes COMLd are provided to the same layer as that of the first electrodes COML. Specifically, the signal lines SGL are provided on the first substrate 21 with an insulating layer 58 interposed therebetween. The first electrodes COML and the third electrodes COMLd are provided on the signal lines SGL with an insulating layer 59 interposed therebetween. The pixel electrodes 22 are provided on the first electrodes COML and the third electrodes COMLd with the insulating layer 24 interposed therebetween. In other words, the third electrodes COMLd are disposed between the signal lines SGL and the pixel electrodes 22 in the thickness direction of the first substrate 21.

As illustrated in FIGS. 11 and 12, the third electrode COMLd is provided under one pixel Pix including three sub-pixels SPix. Specifically, the width of the third electrode COMLd is substantially equal to that of one pixel Pix. In other words, the third electrode COMLd is provided under the three color areas 32R, 32G, and 32B of the color filter 32. By contrast, the first electrode COML has a width substantially equal to that of several ten to several hundred pixel electrodes 22. The signal line SGL is disposed between the third electrode COMLd and the first electrode COML adjacent to each other. The third electrodes COMLd according to the present embodiment are made of the same material as that of the first electrodes COML, that is, a translucent conductive material, such as ITO.

As illustrated in FIG. 12, light-shielding layers 37 are provided at the borders between the color filters 32 corresponding to the respective sub-pixels SPix. The light-shielding layers 37 are colored resin layers or metal layers called a black matrix. The light-shielding layers 37 are provided at positions overlapping the respective signal lines SGL.

In touch detection by the CDM drive described above, the third electrodes COMLd are supplied with no drive signal Vcom and brought into a floating state where their electric potential is not fixed. When one of the first electrodes COML adjacent to each other across the third electrode COMLd is supplied with the drive signal Vcom(+), and the other thereof is supplied with the drive signal Vcom(−) having a phase different from that of the drive signal Vcom(+), the electric potential of the third electrode COMLd is an intermediate potential between the drive signal Vcom(+) and the drive signal Vcom(−).

In a case where the drive signal Vcom(+) and the drive signal Vcom(−) are voltage signals in which the high level voltage $V_H$ and the low level voltage $V_L$ alternately appear as described above, for example, the electric potential of the third electrode COMLd is expressed by $(V_H+V_L)/2$. Consequently, the potential difference between the first electrode COML and the third electrode COMLd is expressed by $(V_H-V_L)/2$.

With the third electrodes COMLd driven as described above, the space between the first electrodes COML supplied with the signals having opposite phases is widened in CDM drive. The third electrodes COMLd having the intermediate potential are provided between the first electrodes COML. Electric fields are generated between one of the first electrodes COML and the third electrode COMLd and between the other thereof and the third electrode COMLd. Because the third electrode COMLd has the intermediate potential, the electric fields are smaller than electric fields generated in a case where the first electrodes COML are provided adjacent to each other. Consequently, the electric fields do not become large enough to drive the liquid crystal molecules. This configuration substantially reduces the gradient of potential difference between the first electrodes COML. Consequently, this configuration suppresses disturbance in the orientation of the liquid crystal molecules caused by CDM drive performed on the first electrodes COML. As a result, the display device 1 according to the present embodiment can increase the accuracy in touch detection by CDM drive and suppress deterioration in a displayed image caused by the CDM drive. As described above, the third electrodes COMLd serve as a conductive body that reduces the gradient of potential difference between the first electrodes COML.

Figure 13:
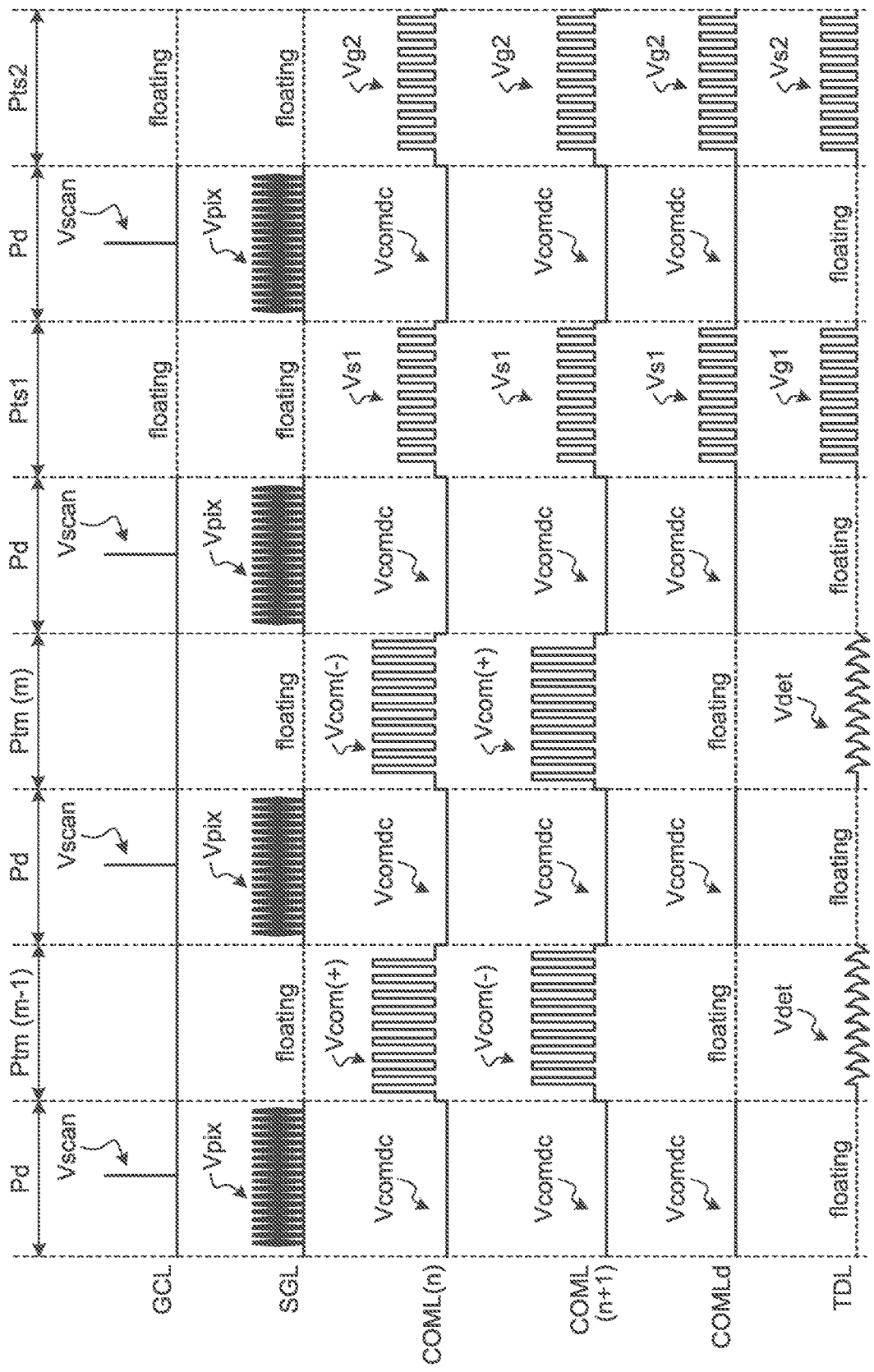
FIG. 13 is a timing waveform chart of an exemplary operation performed by the display device according to the first embodiment.

The following describes an example of an operation performed by the display device 1 according to the present embodiment. FIG. 13 is a timing waveform chart of an exemplary operation performed by the display device according to the first embodiment. FIG. 14 is a table of an exemplary operation performed by the display device according to the first embodiment.

The display device 1 performs a touch detection operation (detection period) and a display operation (display period) in a time-division manner. The display device 1 may perform the touch detection operation and the display operation in any division manner. The following describes a case where the display device 1 performs touch detection and display in a time-division manner in one frame period of the display panel 10, that is, in a time required to display video information of one screen, for example.

As illustrated in FIG. 13, a plurality of display periods Pd and a plurality of detection periods Ptm(m−1), Ptm(m), Pts1, and Pts2 are alternately arranged. The detection periods Ptm(m−1), Ptm(m), Pts1, and Pts2 are hereinafter referred to as the detection periods Pt when they need not be distinguished from one another.

In the detection periods Ptm(m−1) and Ptm(m), the display device 1 detects the object to be detected CQ by CDM drive based on the basic principle of mutual capacitance touch detection described above. In the detection periods Pts1 and Pts2, the display device 1 detects the object to be detected CQ based on the basic principle of self-capacitance touch detection described above. FIG. 13 illustrates two detection periods Ptm(m−1) and Ptm(m), and FIG. 14 illustrates four detection periods Ptm(1) to Ptm(4). The present disclosure is not limited thereto, and one frame period may have four or more detection periods Ptm(m), specifically, ten or more detection periods Ptm(m), for example. FIG. 13 illustrates a first electrode COML(n) and a first electrode COML(n+1) supplied with drive signals having opposite phases out of the first electrodes COML. FIG. 14 illustrates first electrodes COML1 to COML8. The configuration is not limited thereto, and nine or more first electrodes COML may be provided.

In the display periods Pd, the display device 1 performs the display operation described above. The first electrodes COML(n) and COML(n+1) and the third electrodes COMLd according to the present embodiment also serve as common electrodes of the display panel 10. As illustrated in FIG. 14, in the display periods Pd, the first electrode driver 14 supplies the display drive signals Vcomdc serving as a common potential for display drive to all the first electrodes COML1 to COML8 and the third electrodes COMLd in the display area Ad. As illustrated in FIG. 13, the second electrodes TDL are brought into a floating state.

In the detection periods Ptm(m−1) and Ptm(m), the first electrode driver 14 supplies the drive signal Vcom(+) and the drive signal Vcom(−) having different phases to the first electrodes COML(n) and COML(n+1) based on a predetermined code. The second electrodes TDL output the detection signals Vdet to the detector 40 based on the basic principle of mutual capacitance touch detection. The third electrodes COMLd are in a floating state.

The signal lines SGL are supplied with no voltage signal and are in a floating state where their electric potential is not fixed. The electric potential of the signal lines SGL changes with the same electric potential as that of the first electrodes COML overlapping the signal lines SGL. This mechanism can reduce stray capacitance between the first electrodes COML and the signal lines SGL.

More specifically, in the detection periods Ptm(1) to Ptm(4) illustrated in FIG. 14, the display device 1 performs CDM drive based on the square matrix M represented by Expression (2) described above. The drive in the detection period Ptm(1) is performed as follows. The first electrode driver 14 supplies the drive signal Vcom(+) to the first electrodes COML1 to COML4 corresponding to the code "1" based on the codes in the first row of the square matrix M. No drive signal Vcom(−) is supplied because no code "−1" is present in the first row of the square matrix M. In the detection period Ptm(1), all the third electrodes COMLd are brought into a floating state.

The drive in the detection period Ptm(2) is performed as follows. The first electrode driver 14 supplies the drive signal Vcom(+) to the first electrodes COML1 and COML2 corresponding to the code "1" based on the codes in the second row of the square matrix M. In the same period, the first electrode driver 14 supplies the drive signal Vcom(−) to the first electrodes COML3 and COML4 corresponding to the code "−1" in the second row of the square matrix M. In the detection period Ptm(2), all the third electrodes COMLd are brought into a floating state.

The drive in the detection period Ptm(3) is performed as follows. The first electrode driver 14 supplies the drive signal Vcom(+) to the first electrodes COML1 and COML3 corresponding to the code "1" based on the codes in the third row of the square matrix M. In the same period, the first electrode driver 14 supplies the drive signal Vcom(−) to the first electrodes COML2 and COML4 corresponding to the code "−1" in the third row of the square matrix M. In the detection period Ptm(3), all the third electrodes COMLd are brought into a floating state.

The drive in the detection period Ptm(4) is performed as follows. The first electrode driver 14 supplies the drive signal Vcom(+) to the first electrodes COML1 and COML4 corresponding to the code "1" based on the codes in the fourth row of the square matrix M. In the same period, the first electrode driver 14 supplies the drive signal Vcom(−) to the first electrodes COML2 and COML3 corresponding to the code "−1" in the fourth row of the square matrix M. In the detection period Ptm(4), all the third electrodes COMLd are brought into a floating state.

The detector 40 decodes the detection signals Vdet detected in the detection periods Ptm(1) to Ptm(4). Consequently, the display device 1 can detect the object to be detected CQ with detection sensitivity higher than that in a case where it performs time-division multiplex drive.

The first electrodes COML5 to COML8 are included in the non-selected block NTX and supplied with the display drive signal Vcomdc as the DC voltage signal. All the third electrodes COMLd are brought into a floating state. In the next detection period Ptm(5) to the detection period Ptm(8), which are not illustrated, the first electrodes COML5 to COML8 are selected as the drive electrode block BKn. The first electrode driver 14 supplies the drive signal Vcom(+) or the drive signal Vcom(−) to the first electrodes COML5 to COML8 based on the square matrix M. By contrast, the first electrodes COML1 to COML4 are included in the non-selected block NTX and supplied with the display drive signal Vcomdc as the DC voltage signal.

As illustrated in FIGS. 13 and 14, in the detection period Pts1, the first electrode driver 14 supplies the drive signals Vs1 to all the first electrodes COML and the third electrodes COMLd. The first electrodes COML and the third electrodes COMLd output the detection signals VdetA corresponding to the capacitance changes to the detector 40 via the first electrode driver 14.

The first electrodes COML according to the present embodiment serve not only as drive electrodes in mutual and self-capacitance touch detection by CDM drive but also as detection electrodes in self-capacitance touch detection. The third electrodes COMLd serve not only as a conductive body that reduces the gradient of potential difference between the first electrodes COML but also as detection electrodes in self-capacitance touch detection.

As illustrated in FIG. 13, in the detection period Pts1, the signal lines SGL and the gate lines GCL are supplied with no voltage signal and are in a floating state where their electric potential is not fixed. This mechanism suppresses capacitive coupling between the first electrodes COML and the signal lines SGL and between the third electrodes COMLd and the signal lines SGL. This mechanism also suppresses capacitive coupling between the first electrodes COML and the gate lines GCL and between the third electrodes COMLd and the gate lines GCL. As a result, stray capacitance is reduced, thereby suppressing reduction in the detection sensitivity in touch detection.

In the detection period Pts1, the second electrode driver 15 supplies guard signals Vg1 to the second electrodes TDL. The guard signal Vg1 is an AC voltage signal synchronized with the drive signal Vs1 and having the same electric potential as that of the drive signal Vs1, for example. As a result, the second electrodes TDL are driven at the same electric potential as that of the first electrodes COML and the third electrodes COMLd. This mechanism suppresses stray capacitance between the first electrodes COML and the second electrodes TDL and between the third electrodes COMLd and the second electrodes TDL. In the detection period Pts1, the second electrodes TDL serve as guard electrodes.

As illustrated in FIG. 13, in the detection period Pts2, the second electrode driver 15 supplies the drive signals Vs2 to all the second electrodes TDL. The second electrodes TDL output the detection signals VdetB corresponding to the capacitance changes to the detector 40 via the second electrode driver 15. The second electrodes TDL according to the present embodiment serve not only as detection electrodes in mutual and self-capacitance touch detection but also as detection electrodes in self-capacitance touch detection.

As illustrated in FIGS. 13 and 14, in the detection period Pts2, the signal lines SGL and the gate lines GCL are supplied with no voltage signal and are in a floating state where their electric potential is not fixed. This mechanism suppresses capacitive coupling between the second electrodes TDL and the signal lines SGL, thereby reducing stray capacitance. This mechanism also suppresses capacitive coupling between the second electrodes TDL and the gate lines GCL, thereby reducing stray capacitance. Consequently, the display device 1 can suppress reduction in the detection sensitivity in touch detection.

In the detection period Pts2, the first electrode driver 14 supplies guard signals Vg2 to the first electrodes COML and the third electrodes COMLd. The guard signal Vg2 is an AC voltage signal synchronized with the drive signal Vs2 and having the same electric potential as that of the drive signal Vs2, for example. As a result, the first electrodes COML and the third electrodes COMLd are driven at the same electric potential as that of the second electrodes TDL. This mechanism suppresses stray capacitance between the second electrodes TDL and the first electrodes COML and between the second electrodes TDL and the third electrodes COMLd.

As described above, the first electrodes COML serve not only as drive electrodes in mutual capacitance touch detection by CDM drive but also as guard electrodes in the detection period Pts2. The third electrodes COMLd serve not only as a conductive body that reduces the gradient of potential difference between the first electrodes COML but also as guard electrodes in the detection period Pts2.

The detector 40 can detect the position of the object to be detected CQ in the first direction Dx (refer to FIG. 6) based on the detection signals VdetA received in the detection period Pts1. The detector 40 can detect the position of the object to be detected CQ in the second direction Dy based on the detection signals VdetB received in the detection period Pts2. The detector 40 thus can determine whether touch input is made on the display area Ad and calculate the coordinates of the input position. As described above, the display device 1 can perform self-capacitance touch detection.

In the detection periods Ptm for performing mutual capacitance touch detection, the center positions of the first electrodes COML in the first direction Dx correspond to the positions indicated by center lines Cx1, Cx2, Cx3, and Cx4 as illustrated in FIG. 11. In other words, the detector 40 calculates the coordinates of the input position in the detection periods Ptm based on the center lines Cx1, Cx2, Cx3, and Cx4.

By contrast, in the detection period Pts1 for performing self-capacitance touch detection, the third electrodes COMLd also serve as detection electrodes beside the first electrodes COML. In this case, if the detector 40 calculates the input position in the first direction Dx on each third electrode COMLd, the amount of arithmetic processing performed by the detector 40 increases. Furthermore, the arithmetic processing may possibly be complicated because the reference position for the coordinates of the input position differs between mutual capacitance touch detection and self-capacitance touch detection.

As illustrated in FIG. 11, in self-capacitance touch detection, one first electrode COML (e.g., the first electrode COML2) and two third electrodes COMLd adjacent to the first electrode COML are preferably collectively driven as a drive electrode block BKa. The drive electrode block BKa includes a first electrode COML, a third electrode COMLd facing one side of the first electrode COML in the first direction Dx, and a third electrode COMLd facing the other side of the first electrode COML in the first direction Dx. With this configuration, the center position of the first electrode COML2 in the first direction Dx corresponds to the center line Cx2. The center position of the drive electrode block BKa including the first electrode COML2 in the first direction Dx also corresponds to the center line Cx2. In other words, the reference position for the coordinates of the input position does not differ between mutual capacitance touch detection and self-capacitance touch detection. Consequently, the display device 1 can accurately perform touch detection.

Figure 15:
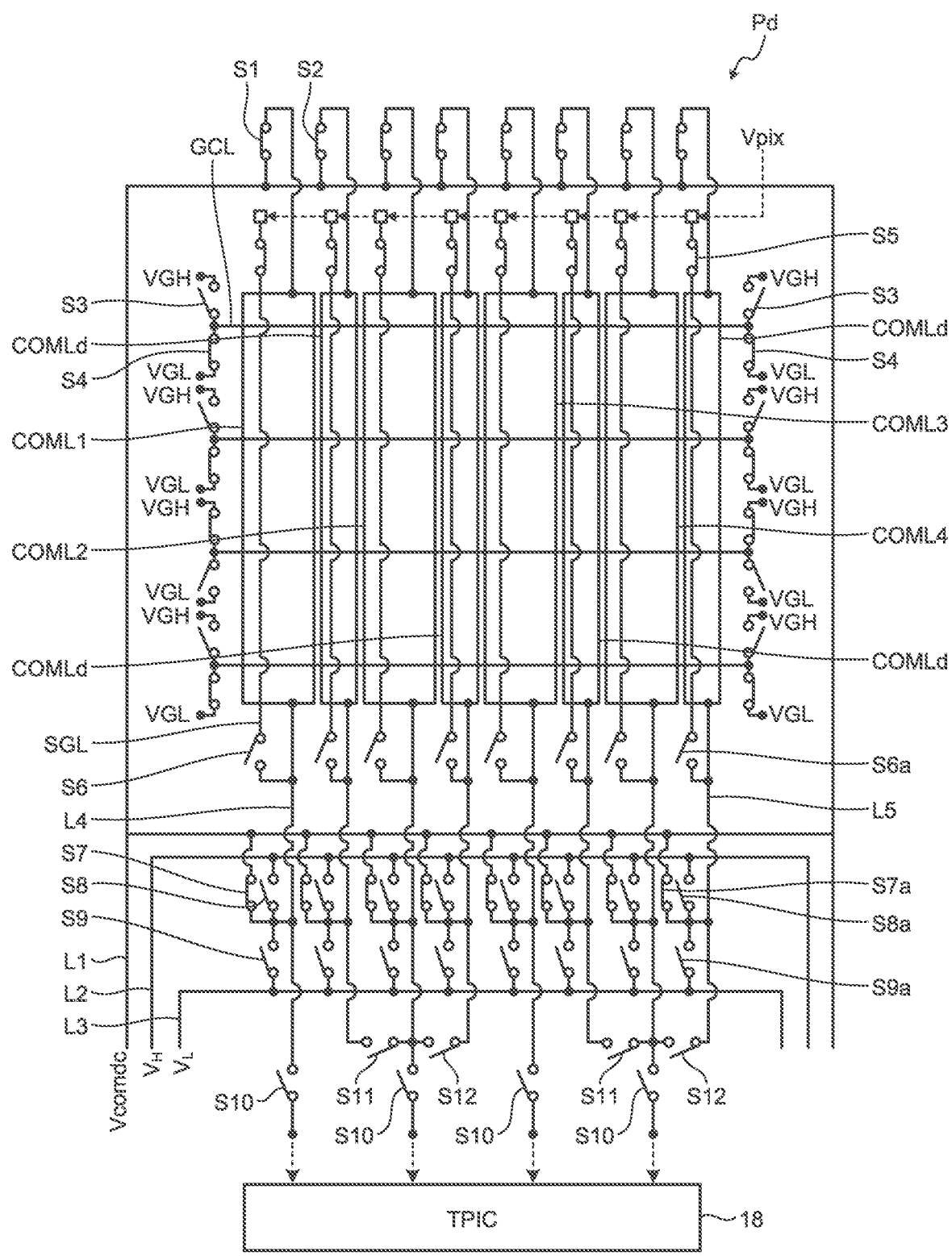
FIG. 15 is a circuit diagram for explaining the coupling configuration between the first electrodes and the third electrodes in a display period.
Figure 16:
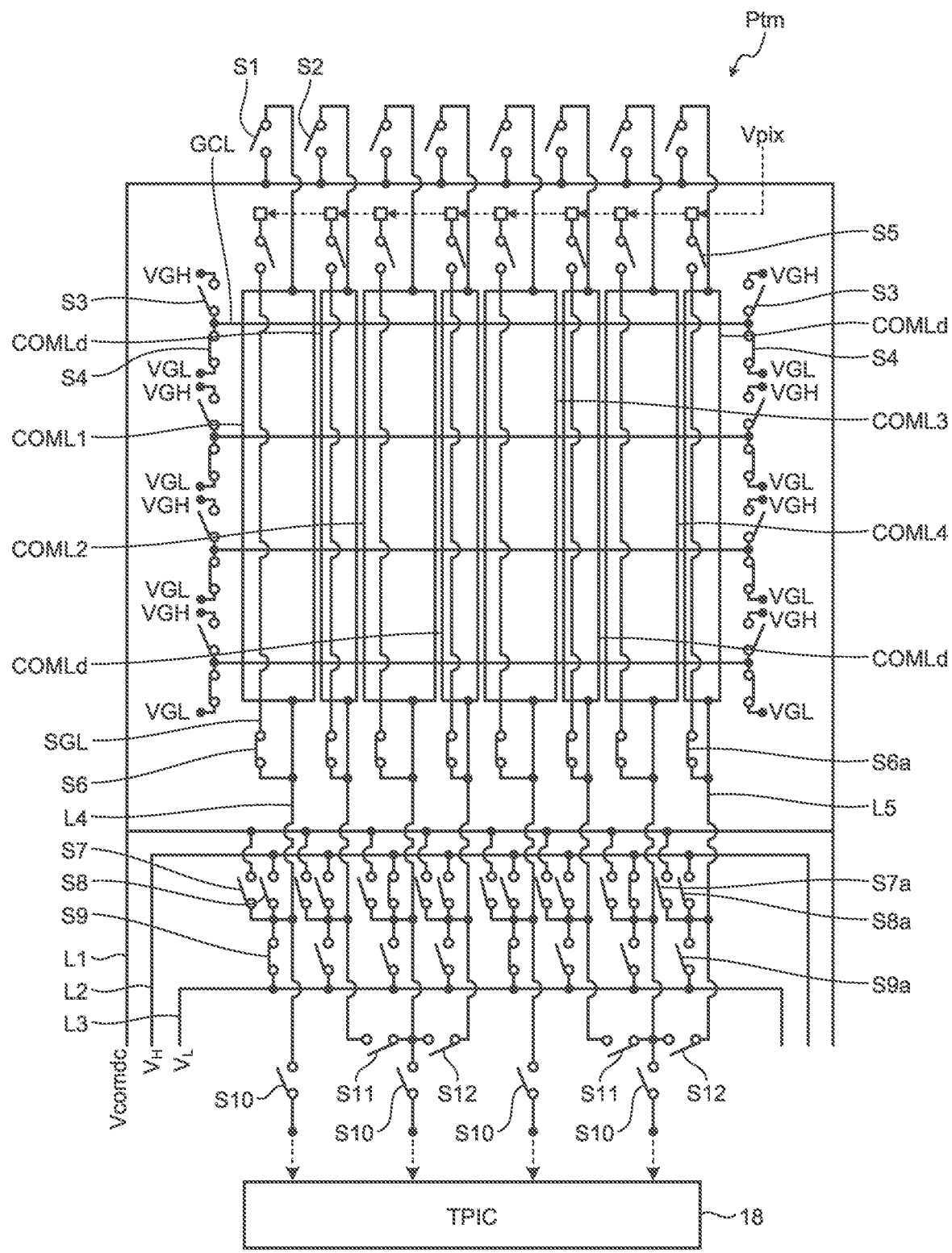
FIG. 16 is a circuit diagram for explaining the coupling configuration between the first electrodes and the third electrodes in a mutual capacitance detection period.
Figure 17:
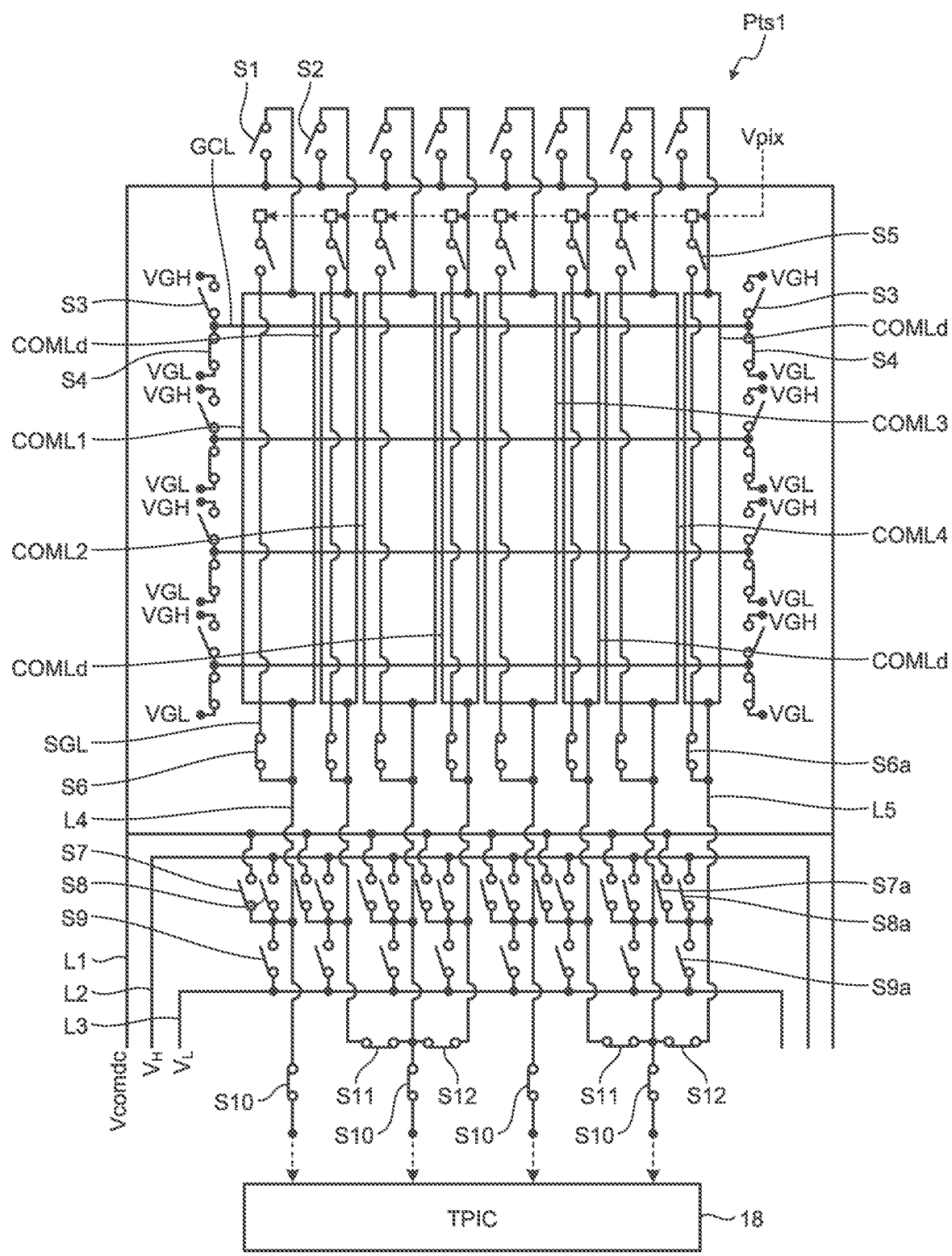
FIG. 17 is a circuit diagram for explaining the coupling configuration between the first electrodes and the third electrodes in a self-capacitance detection period.

The following describes the coupling configuration for supplying various kinds of signals to the first electrodes COML and the third electrodes COMLd. FIG. 15 is a circuit diagram for explaining the coupling configuration between the first electrodes and the third electrodes in the display period. FIG. 16 is a circuit diagram for explaining the coupling configuration between the first electrodes and the third electrodes in the mutual capacitance detection period. FIG. 17 is a circuit diagram for explaining the coupling configuration between the first electrodes and the third electrodes in the self-capacitance detection period.

As illustrated in FIGS. 15 to 17, the display drive signal Vcomdc is supplied to the first electrodes COML and the third electrodes COMLd via a wire L1. The high level voltage $V_H$ of the detection drive signal Vcom is supplied to the first electrodes COML and the third electrodes COMLd via a wire L2. The low level voltage $V_L$ of the detection drive signal Vcom is supplied to the first electrodes COML and the third electrodes COMLd via a wire L3. A wire L4 couples the first electrode COML to the touch IC 18. A wire L5 couples the third electrode COMLd to the touch IC 18.

A switch S1 is provided between the wire L1 and the first electrode COML. A switch S2 is provided between the wire L1 and the third electrode COMLd. A high level voltage VGH of the scanning signal Vscan is supplied to the gate line GCL via a switch S3. A low level voltage VGL of the scanning signal Vscan is supplied to the gate line GCL via a switch S4. The pixel signal Vpix is supplied to the signal line SGL via a switch S5.

A switch S6 is provided between the signal line SGL and the first electrode COML. A switch S6*a* is provided between the signal line SGL and the third electrode COMLd. A switch S7 is provided between the wire L1 and the wire L4 (first electrode COML). A switch S7*a* is provided between the wire L1 and the wire L5 (third electrode COMLd). A switch S8 is provided between the wire L2 and the wire L4 (first electrode COML). A switch S8*a* is provided between the wire L2 and the wire L5 (third electrode COMLd). A switch S9 is provided between the wire L3 and the wire L4 (first electrode COML). A switch S9*a* is provided between the wire L3 and the wire L5 (third electrode COMLd). A switch S10 is provided to the wire L4 between the first electrode COML and the touch IC 18. A switch S11 and a switch S12 are each provided between the wire L4 (first electrode COML) and the wire L5 (third electrode COMLd). In other words, the switches S11 and S12 can each switch between coupling and cutoff of the first electrode COML to and from the third electrode COMLd.

As illustrated in FIG. 15, the switches S1 and the switches S2 are turned on in the display period Pd. As a result, the first electrodes COML are coupled to the wire L1, and the third electrodes COMLd are coupled to the wire L1. The display drive signals Vcomdc are supplied to the first electrodes COML and the third electrodes COMLd via the wire L1. The switches S7 and the switches S7a are turned on. As a result, the wire L1 is coupled to the first electrodes COML and the third electrodes COMLd. The display drive signals Vcomdc are supplied to the first electrodes COML and the third electrodes COMLd via the wire L1. As described above, in the example illustrated in FIG. 15, the display drive signals Vcomdc are supplied to the first electrodes COML from both ends. The display drive signals Vcomdc are also supplied to the third electrodes COMLd from both ends.

The switches S3 and the switches S4 coupled to the gate lines GCL perform opposite operations. When the switches S3 are turned on, the switches S4 are turned off. When the switches S3 are turned off, the switches S4 are turned on. The switch S3 is sequentially turned on, whereby the high level voltage VGH of the scanning signal Vscan is supplied to the selected gate line GCL. The non-selected gate lines GCL are supplied with the low level voltage VGL. The switches S5 are turned on, whereby the pixel signals Vpix are supplied to the signal lines SGL.

In the display period Pd, the switches S6 are turned off, whereby the signal lines SGL are cut off from the respective first electrodes COML. The switches S6a are turned off, whereby the signal lines SGL are cut off from the respective third electrodes COMLd. All the switches S8, S8a, S9, S9a, S10, S11, and S12 are turned off. As a result, the first electrodes COML and the third electrodes COMLd are cut off from the wire L2, the wire L3, and the touch IC 18. With this coupling configuration, neither the detection drive signal Vcom nor the detection drive signal Vs1 is supplied to the first electrodes COML and the third electrodes COMLd in the display period Pd.

As illustrated in FIG. 16, the switches S1 and the switches S2 are turned off in the mutual capacitance detection period Ptm. The switches S7 and the switches S7a are turned off. The first electrodes COML are cut off from the wire L1, and the third electrodes COMLd are also cut off from the wire L1. As a result, no display drive signal Vcomdc is supplied to the first electrodes COML and the third electrodes COMLd.

In the detection period Ptm, all the switches S3 are turned off, and all the switches S4 are turned on. As a result, the low level voltage VGL is supplied to the gate lines GCL as the DC voltage signal. All the switches S5 are turned off, whereby no pixel signal Vpix is supplied to the signal lines SGL.

The switches S6 are turned on, whereby the signal lines SGL are coupled to the respective first electrodes COML via the wires L4. The switches S6a are also turned on, whereby the signal lines SGL are coupled to the respective third electrodes COMLd via the wires L5. As a result, the same signals as those supplied to the first electrodes COML are supplied to the signal lines SGL as guard signals. In the detection period Ptm, the switches S6 and the switches S6a may be turned off. In this case, the signal lines SGL are supplied with no voltage signal and brought into a floating state where their electric potential is not fixed.

In the detection period Ptm, the switch S8 and the switch S9 coupled to one wire L4 perform opposite operations. When the switch S8 is turned on, the switch S9 is turned off. When the switch S8 is turned off, the switch S9 is turned on. The switches S8 and S9 are turned on and off repeatedly, whereby the high level voltage $V_H$ and the low level voltage $V_L$ are alternately supplied to the first electrode COML via the wire L4. As a result, the detection drive signal Vcom is supplied to the first electrode COML.

Because the present embodiment performs CDM drive, the switches S8 and S9 operate at different timings for each first electrode COML. In the example illustrated in FIG. 16, the switch S8 coupled to the first electrode COML1 is turned off, and the switch S9 coupled thereto is turned on, for example. At the same timing, the switch S8 coupled to the first electrode COML2 is turned on, and the switch S9 coupled thereto is turned off. The switch S8 coupled to the first electrode COML3 is turned off, and the switch S9 coupled thereto is turned on. The switch S8 coupled to the first electrode COML4 is turned on, and the switch S9 coupled thereto is turned off.

As described above, the switches S8 and S9 perform opposite operations on each first electrode COML, thereby supplying the drive signal Vcom(+) and the drive signal Vcom(−) having a phase different from that of the drive signal Vcom(+) alternately to the first electrode COML. All the switches S10 are turned off, whereby the first electrodes COML are cut off from the touch IC 18. In the detection period Ptm, the second electrodes TDL (not illustrated) are coupled to the touch IC 18. The second electrodes TDL output the detection signals Vdet corresponding to the changes in capacitance between the first electrodes COML and the second electrodes TDL to the touch IC 18.

As illustrated in FIG. 16, all the switches S7a, S8a, and S9a coupled to the wires L5 are turned off. As a result, the third electrodes COMLd are cut off from the wires L1, L2, and L3. The switches S11 and the switches S12 are turned off. As a result, the wires L5 are cut off from the wires L4, whereby two third electrodes COMLd adjacent to the first electrode COML2 are cut off from the first electrode COML2. Two third electrodes COMLd adjacent to the first electrode COML4 are cut off from the first electrode COML4. With this coupling configuration, the third electrodes COMLd are supplied with no voltage signal and brought into a floating state where their electric potential is not fixed.

With the coupling configuration described above, the third electrodes COMLd are brought into a floating state in CDM drive. Consequently, the present embodiment can reduce the gradient of potential difference between the first electrodes COML supplied with the drive signal Vcom(+) and the drive signal Vcom(−) having different phases.

As illustrated in FIG. 17, the switches S1 and the switches S2 are turned off in the self-capacitance detection period Pts1. The switches S7 and the switches S7a are turned off. The first electrodes COML are cut off from the wire L1, and the third electrodes COMLd are also cut off from the wire L1. As a result, no display drive signal Vcomdc is supplied to the first electrodes COML and the third electrodes COMLd.

In the detection period Pts1, all the switches S3 are turned off, and all the switches S4 are turned on. As a result, the low level voltage VGL is supplied to the gate lines GCL as the DC voltage signal. Alternatively, all the switches S3 and S4 may be turned off, thereby bringing the gate lines GCL into a floating state. All the switches S5 are turned off, whereby no pixel signal Vpix is supplied to the signal lines SGL.

The switches S6 are turned on, whereby the signal lines SGL are coupled to the respective first electrodes COML via the wires L4. The switches S6a are also turned on, whereby the signal lines SGL are coupled to the respective third electrodes COMLd via the wires L5. As a result, the same signals as those supplied to the first electrodes COML are supplied to the signal lines SGL as guard signals. In the detection period Pts1, the switches S6 and the switches S6a may be turned off. In this case, the signal lines SGL are supplied with no voltage signal and brought into a floating state where their electric potential is not fixed.

In the detection period Pts1, all the switches S8 and S9 are turned off, whereby the wires L4 coupled to the respective first electrodes COML are cut off from the wire L2 and the wire L3. All the switches S8a and S9a are also turned off, whereby the wires L5 coupled to the respective third electrodes COMLd are cut off from the wire L2 and the wire L3. As a result, no drive signal Vcom is supplied to the first electrodes COML and the third electrodes COMLd.

All the switches S10 are turned on, whereby the first electrodes COML are coupled to the touch IC 18. The drive signals Vs1 are supplied to the first electrodes COML via the switches S10. The detection signals VdetA corresponding to the capacitance changes in the first electrodes COML are output to the touch IC 18. The drive circuit that supplies the drive signals Vs1 may be included in the touch IC 18 or provided to the first substrate 21.

As illustrated in FIG. 17, the switches S11 and S12 are turned on, whereby one wire L4 is coupled to two wires L5. As a result, two third electrodes COMLd adjacent to the first electrode COML2 are coupled to the first electrode COML2. Two third electrodes COMLd adjacent to the first electrode COML4 are coupled to the first electrode COML4. With this coupling configuration, the first electrode COML2 and the two third electrodes COMLd adjacent to the first electrode COML2 are collectively driven as one drive electrode block BKa (refer to FIG. 11). The first electrode COML4 and the two third electrodes COMLd adjacent to the first electrode COML4 are collectively driven as one drive electrode block BKa. The first electrode COML1 and the first electrode COML3 are provided with neither the switch S11 nor the switch S12 and are not coupled to the third electrodes COMLd. In other words, the first electrode COML1 and the first electrode COML3 are each driven as one detection electrode.

With the coupling configuration described above, the first electrodes COML and the third electrodes COMLd serve as detection electrodes in self-capacitance touch detection.

As described above, the display device 1 according to the present embodiment includes the first substrate 21, the second substrate 31, the liquid crystal layer 6 (display functional layer), the first electrodes COML, the pixel electrodes 22, the second electrodes TDL, the first electrode driver 14 (drive circuit), and the third electrodes COMLd (conductive body). The second substrate 31 faces the first substrate 21. The liquid crystal layer 6 is provided between the first substrate 21 and the second substrate 31 and configured to display an image in the display area Ad. The first electrodes COML are arrayed in the display area Ad between the first substrate 21 and the second substrate 31. The pixel electrodes 22 face the first electrodes COML between the first substrate 21 and the second substrate 31. The second electrodes TDL face the first electrodes COML on the surface of the second substrate 31. The first electrode driver 14 supplies the drive signals to the first electrodes COML. The third electrodes COMLd are provided between adjacent first electrodes COML when viewed in a direction perpendicular to the first substrate 21 and reduces the gradient of potential difference between the first electrodes COML generated when the drive signals are supplied thereto.

With this configuration, the first electrode driver 14 supplies the drive signal Vcom(+) and the drive signal Vcom(−) having different phases to the selected first electrodes COML based on a predetermined code, thereby performing CDM drive. Consequently, the display device 1 can increase the detection sensitivity. With the third electrodes COMLd serving as a conductive body and brought into a floating state, the display device 1 can reduce the gradient of potential difference between the first electrodes COML adjacent to each other across the third electrode COMLd. As a result, electric fields generated between the first electrodes COML are reduced. Consequently, the display device 1 can suppress movement of the liquid crystal molecules in the liquid crystal layer 6, thereby performing high quality display.

While the third electrodes COMLd are brought into a floating state in touch detection by CDM drive, for example, the present disclosure is not limited thereto. The first electrode driver 14 may supply DC voltage signals having the intermediate potential between the high level voltage $V_H$ and the low level voltage $V_L$ to the third electrodes COMLd.

Second Embodiment

Figure 18:
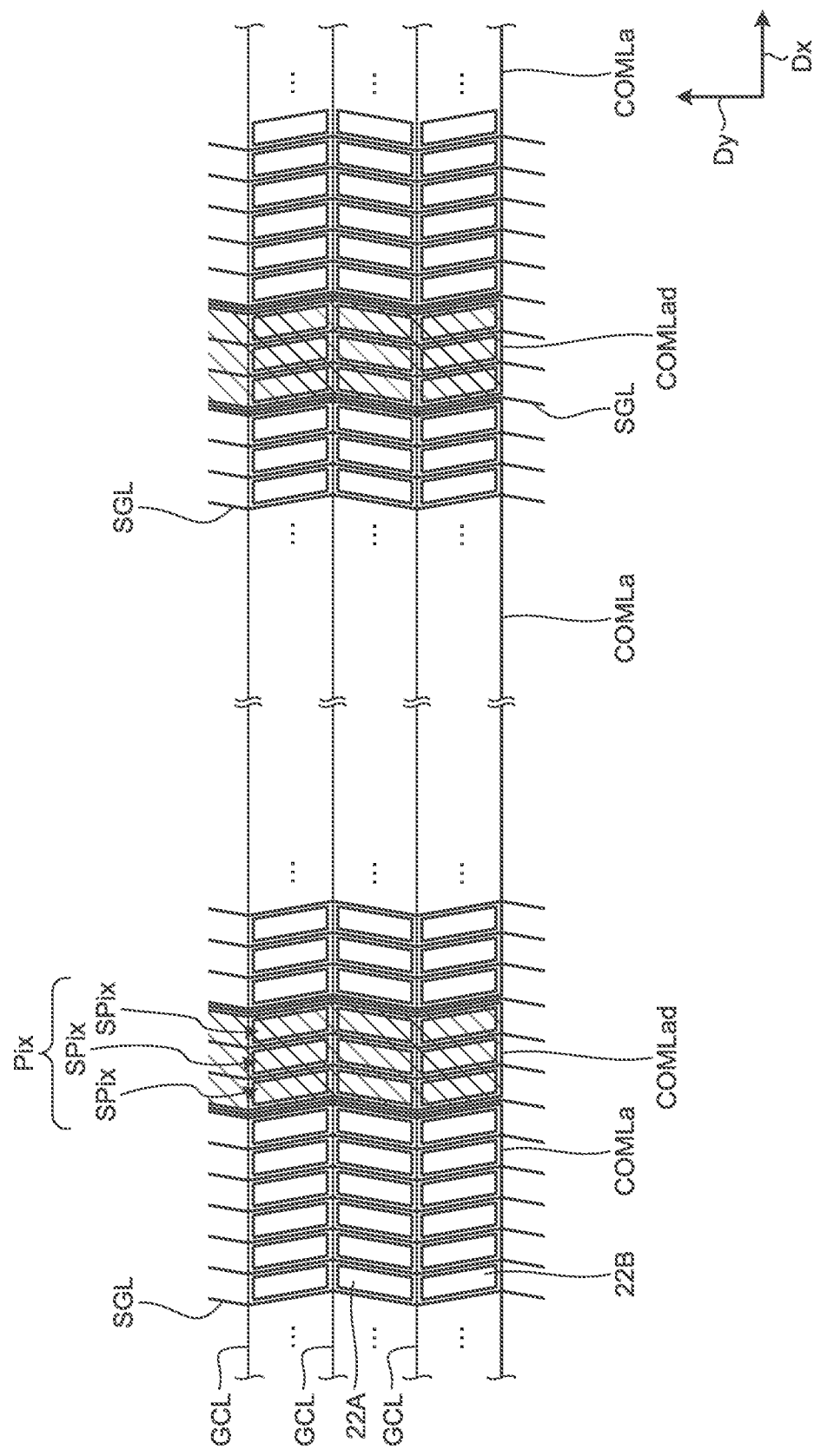
FIG. 18 is a plan view of the pixel array and the relation between the first electrodes and the third electrodes according to a second embodiment of the present disclosure.
Figure 19:
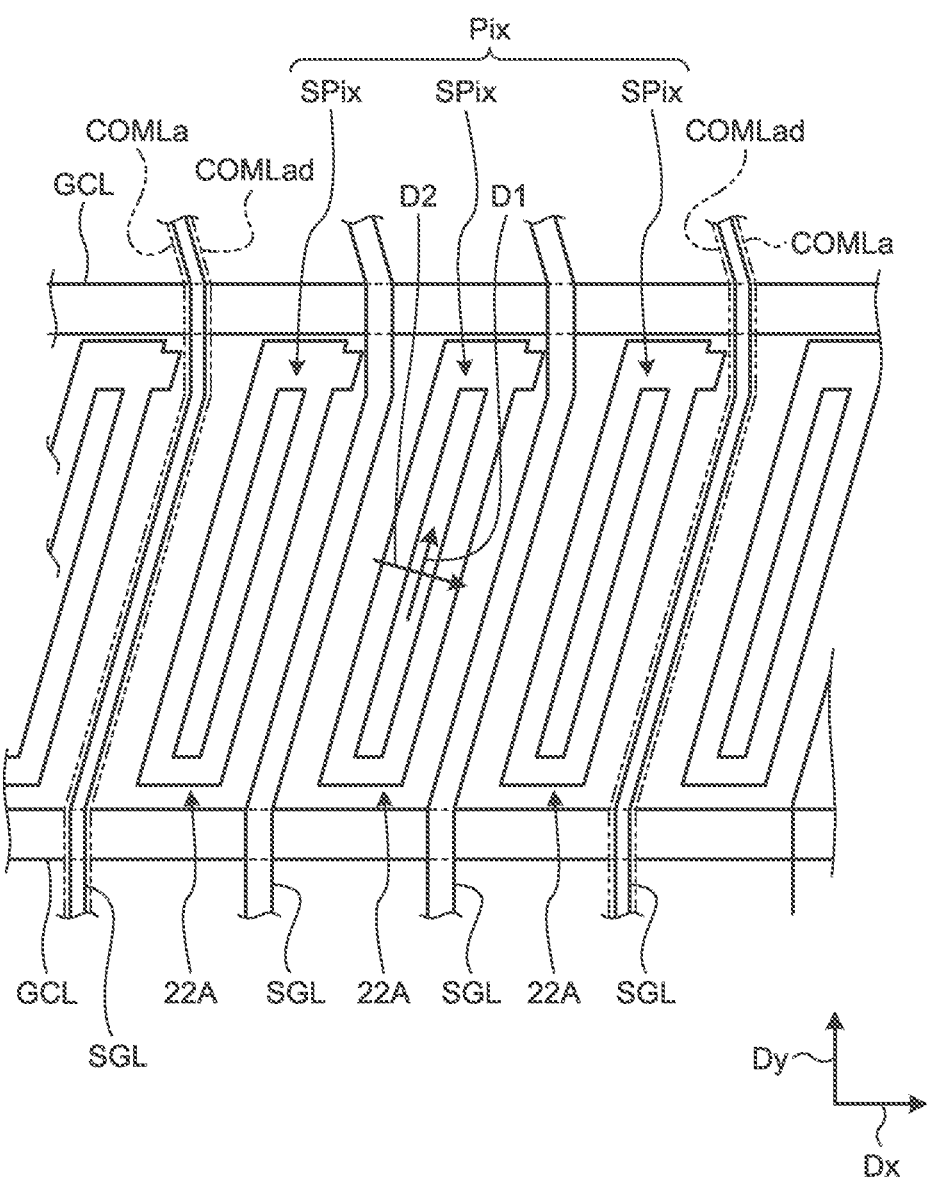
FIG. 19 is an enlarged plan view of pixel electrodes according to the second embodiment.

FIG. 18 is a plan view of the pixel array and the relation between the first electrodes and the third electrodes according to a second embodiment of the present disclosure. FIG. 19 is an enlarged plan view of the pixel electrodes according to the second embodiment. To make the figure easy to see, third electrodes COMLad are hatched in FIG. 18.

As illustrated in FIG. 18, the sub-pixels SPix are arrayed in the first direction Dx and the second direction Dy. A pixel electrode 22A included in the sub-pixel SPix inclines with respect to the second direction Dy. A pixel electrode 22B inclines to the side opposite to the side to which the pixel electrode 22A inclines with respect to the second direction Dy. The pixel electrodes 22A are arrayed in the first direction Dx. The pixel electrodes 22B are also arrayed in the first direction Dx. The pixel electrode 22A and the pixel electrode 22B are alternately arrayed in the second direction Dy.

As illustrated in FIG. 18, the signal lines SGL have a zigzag line shape extending along the pixel electrodes 22A and the pixel electrodes 22B arrayed in the second direction Dy. The gate lines GCL have a straight line shape extending in the first direction Dx. The pixel electrode 22A or the pixel electrode 22B is disposed in an area surrounded by the signal lines SGL and the gate lines GCL.

First electrodes COMLa and the third electrodes COMLad have a zigzag line shape extending along the pixel electrodes 22A and the pixel electrodes 22B arrayed in the second direction Dy. In the example illustrated in FIGS. 18 and 19, the third electrode COMLad provided facing a plurality of pixel electrodes 22A and 22B. The third electrode COMLad is provided between a plurality of pixel electrodes 22A and 22B. The width of the third electrode COMLad is substantially equal to that of one pixel Pix.

The width of the third electrode COMLad according to the present embodiment is substantially equal to that of one pixel Pix and smaller than that of the first electrode COMLa. Consequently, the present embodiment can reduce errors between the detection position of the object to be detected CQ obtained when CDM drive is performed using the third electrodes COMLad and that obtained when self-capacitance touch detection is performed using the third electrodes COMLad and the first electrodes COMLa.

As illustrated in FIG. 19, the signal line SGL is disposed between the first electrode COMLa and the third electrode COMLad adjacent to each other in the first direction Dx. If a potential difference is generated between the adjacent first electrodes COMLa according to the present embodiment, an electric field generated between the first electrodes COMLa acts in the direction indicated by the arrow D2. In other words, the direction of the electric field generated between the first electrodes COMLa adjacent to each other across the third electrode COMLad when the first electrodes COMLa are supplied with the drive signal Vcom(+) and the drive signal Vcom(−) having different phases is different from the initial orientation direction of the liquid crystal layer 6. If no third electrode COMLad is provided, and a potential difference is generated between the adjacent first electrodes COMLa, the orientation of the liquid crystal molecules in the liquid crystal layer 6 may possibly move. As a result, display may possibly deteriorate along the first electrodes COMLa, resulting in low display quality.

Also in the aspect according to the present embodiment where the first electrodes COMLa and the third electrodes COMLad have a zigzag line shape extending in the second direction Dy, the third electrodes COMLad are brought into a floating state in CDM drive, thereby reducing the gradient of potential difference between the first electrodes COMLa. Consequently, the present embodiment can increase the detection sensitivity and perform high quality display.

Figure 20:
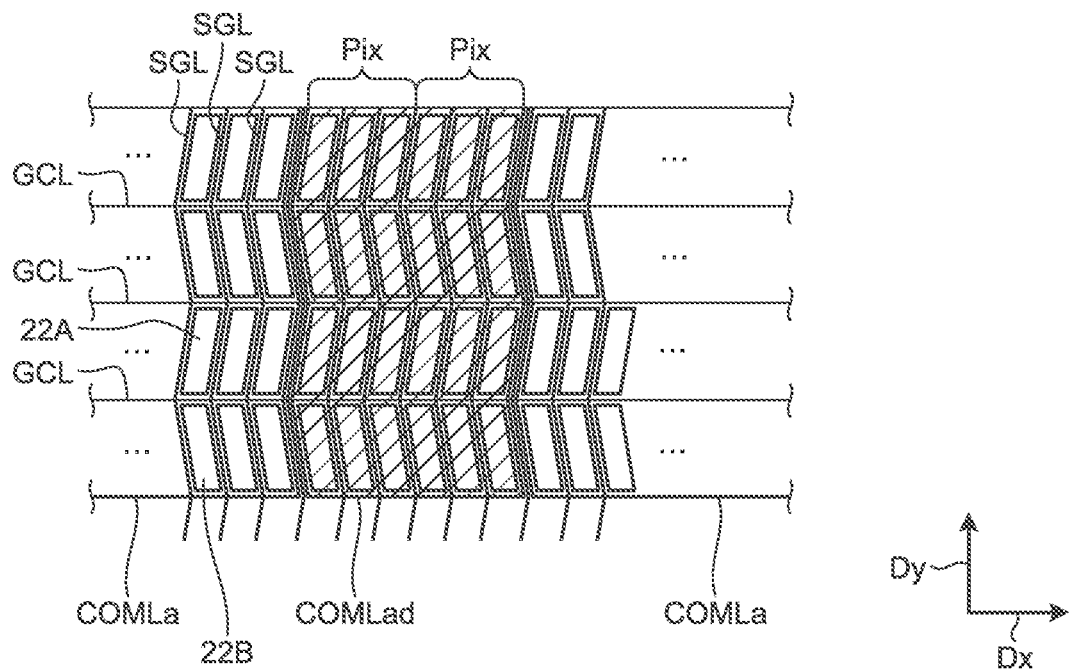
FIG. 20 is a plan view of the pixel array and the relation between the first electrodes and the third electrodes according to a first modification of the second embodiment.

FIG. 20 is a plan view of the pixel array and the relation between the first electrodes and the third electrodes according to a first modification of the second embodiment. As illustrated in FIG. 20, the width of the third electrode COMLad according to the present modification is substantially equal to that of two pixels Pix. An increase in the width of the third electrode COMLad can further reduce the gradient of potential difference between the first electrodes COMLa adjacent to each other across the third electrode COMLad. The configuration is not limited thereto, and the width of the third electrode COMLad may be equal to that of three or more pixels Pix or different from an integral multiple of the width of the pixel Pix.

Figure 21:
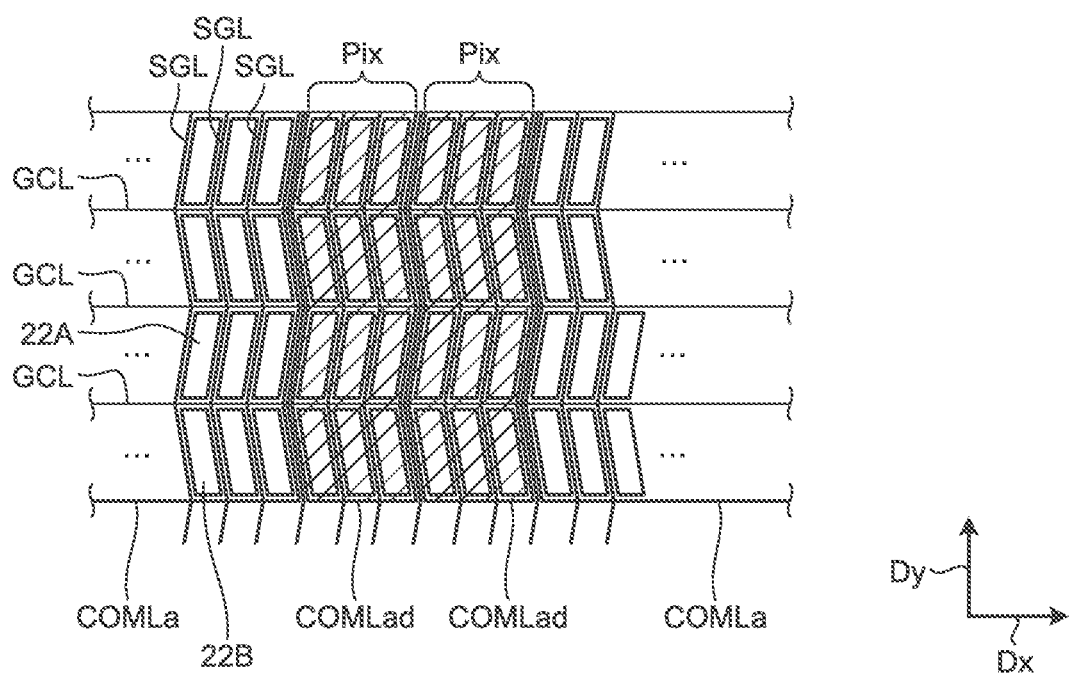
FIG. 21 is a plan view of the pixel array and the relation between the first electrodes and the third electrodes according to a second modification of the second embodiment.

FIG. 21 is a plan view of the pixel array and the relation between the first electrodes and the third electrodes according to a second modification of the second embodiment. As illustrated in FIG. 21, two third electrodes (a pair of the third electrodes) COMLad are provided between two first electrodes COMLa according to the present modification. A plurality of third electrodes COMLad are provided side by side with a space interposed therebetween. The width of the third electrode COMLad is substantially equal to that of one pixel Pix.

The third electrodes COMLad provided side by side have respective electric potentials to provide a plurality of intermediate potentials. Let us assume a case where one of the first electrodes COMLa is supplied with a voltage signal of 10 V as the drive signal Vcom(+), and the other thereof is supplied with a voltage signal of 0 V as the drive signal Vcom(−), for example. In this case, the electric potential of the third electrode COMLad adjacent to the other of the first electrodes COMLa is approximately 3.3 V. The electric potential of the third electrode COMLad adjacent to one of the first electrodes COMLa is approximately 6.6 V. As described above, a plurality of third electrodes COMLad can reduce the potential difference between the electrodes.

Third Embodiment

Figure 22:
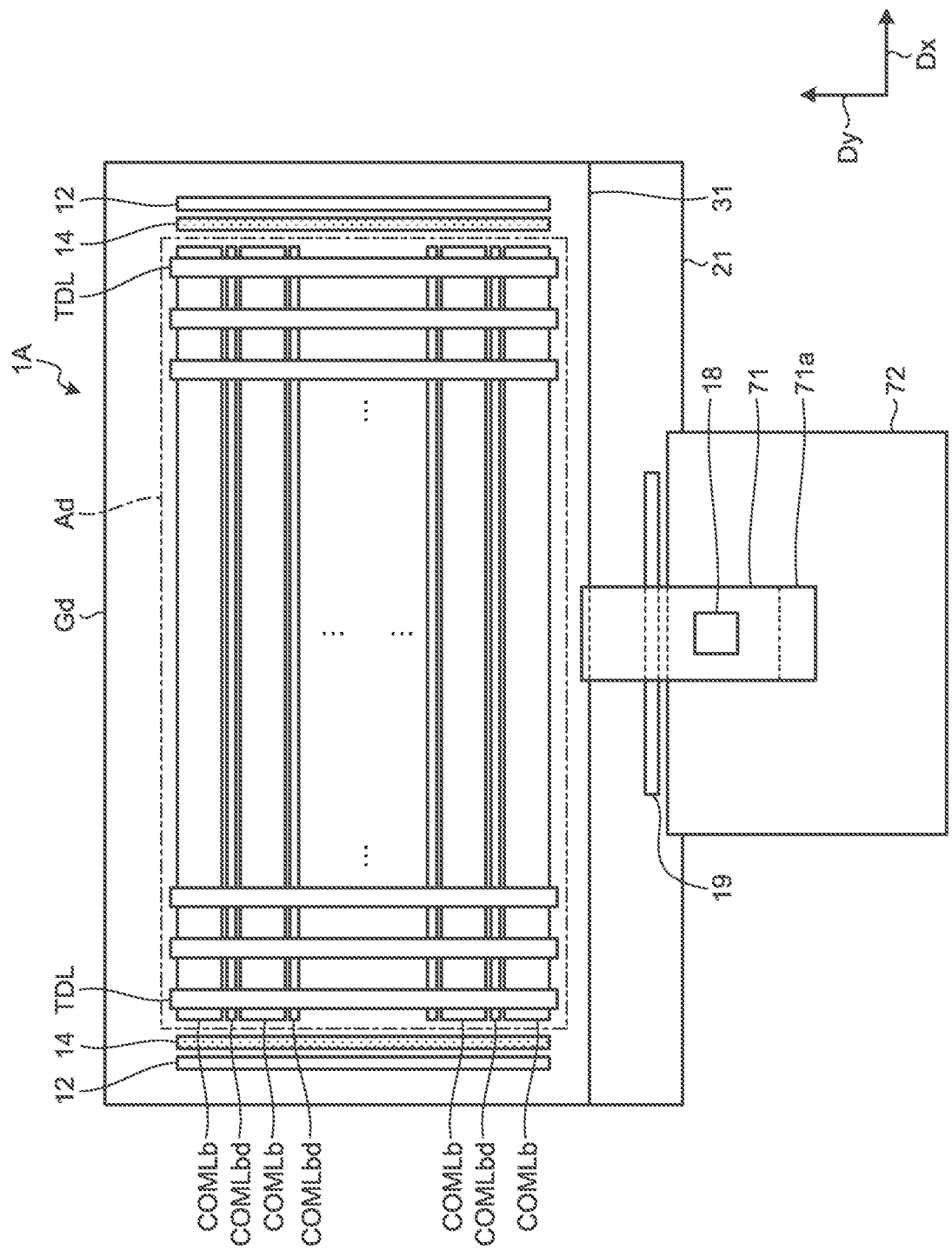
FIG. 22 is a plan view schematically illustrating the relation between the first electrodes, the second electrodes, and the third electrodes according to a third embodiment of the present disclosure.

FIG. 22 is a plan view schematically illustrating the relation between the first electrodes, the second electrodes, and the third electrodes according to a third embodiment of the present invention. As illustrated in FIG. 22, in a display device 1A according to the present embodiment, first electrodes COMLb extend in the first direction Dx and are arrayed in the second direction Dy. Third electrodes COMLbd extend in the first direction Dx and are arrayed in the second direction Dy. The first electrodes COMLb and the third electrodes COMLbd are alternately disposed with a space interposed therebetween in the second direction Dy.

The second electrodes TDL extend in the second direction Dy and are arrayed in the first direction Dx. In other words, the second electrodes TDL intersect the first electrodes COMLb in planar view. Capacitance is formed at the intersections of the first electrodes COMLb and the second electrodes TDL.

The pixel array according to the present embodiment is the same as that in the example illustrated in FIG. 18. In the configuration where the first electrodes COMLb extend along the gate lines GCL, the first electrodes COMLb are arrayed in the second direction Dy. In this case, the direction of an electric field generated between the first electrodes COMLb adjacent to each other across the third electrode COMLbd is different from the initial orientation direction of the liquid crystal layer 6 indicated by the arrow D1 (refer to FIG. 19). If no third electrode COMLbd is provided, and a potential difference is generated between the first electrodes COMLb facing each other, the orientation of the liquid crystal molecules in the liquid crystal layer 6 may possibly move. As a result, display may possibly deteriorate along the first electrodes COMLb, resulting in low display quality.

Also in the present embodiment, the third electrodes COMLbd are provided between the first electrodes COMLb. The third electrodes COMLbd are brought into a floating state in CDM drive, thereby reducing the gradient of potential difference between the first electrodes COMLb. Consequently, the present embodiment can increase the detection sensitivity and perform high quality display.

Fourth Embodiment

Figure 23:
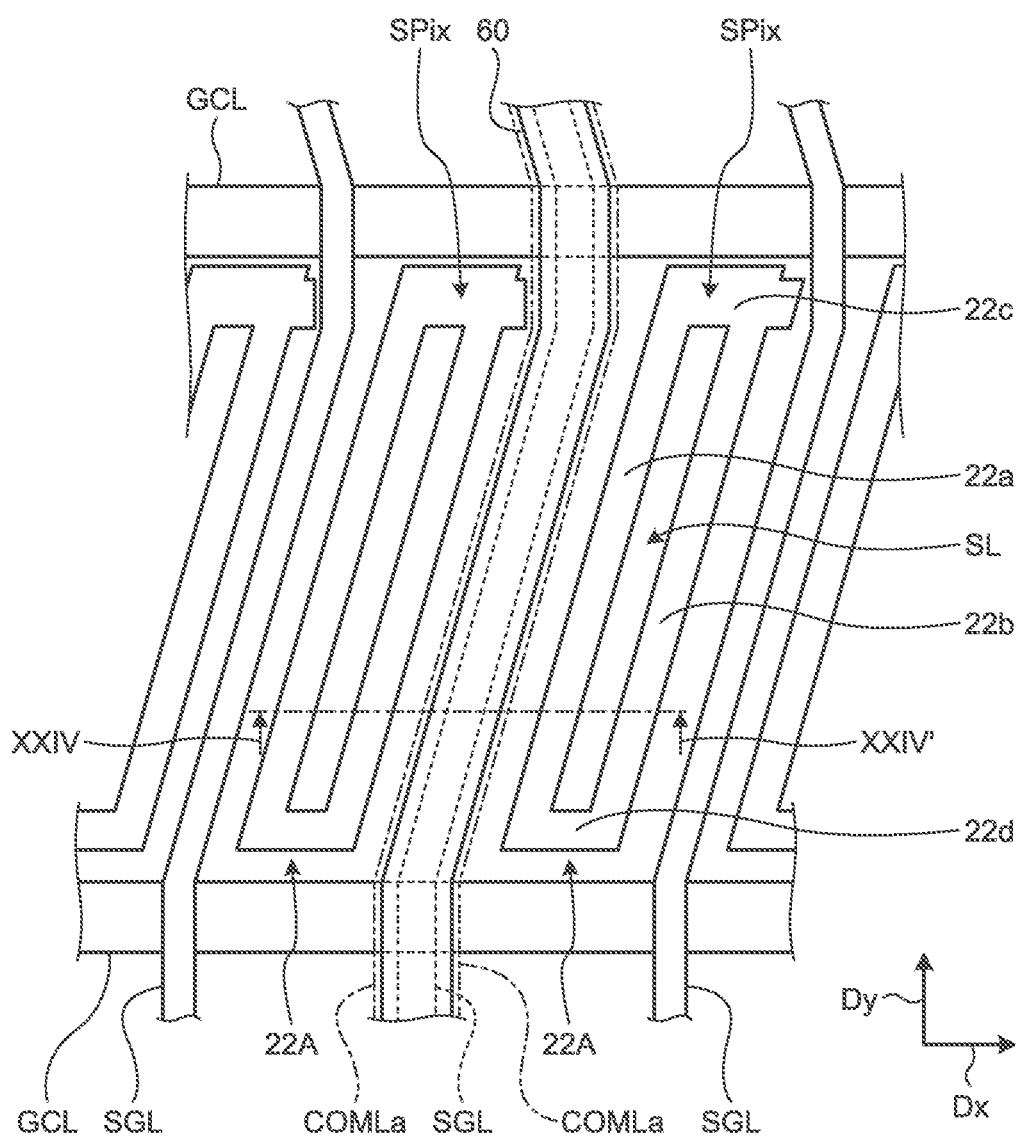
FIG. 23 is an enlarged plan view of the pixel electrodes according to a fourth embodiment of the present disclosure.
Figure 24:
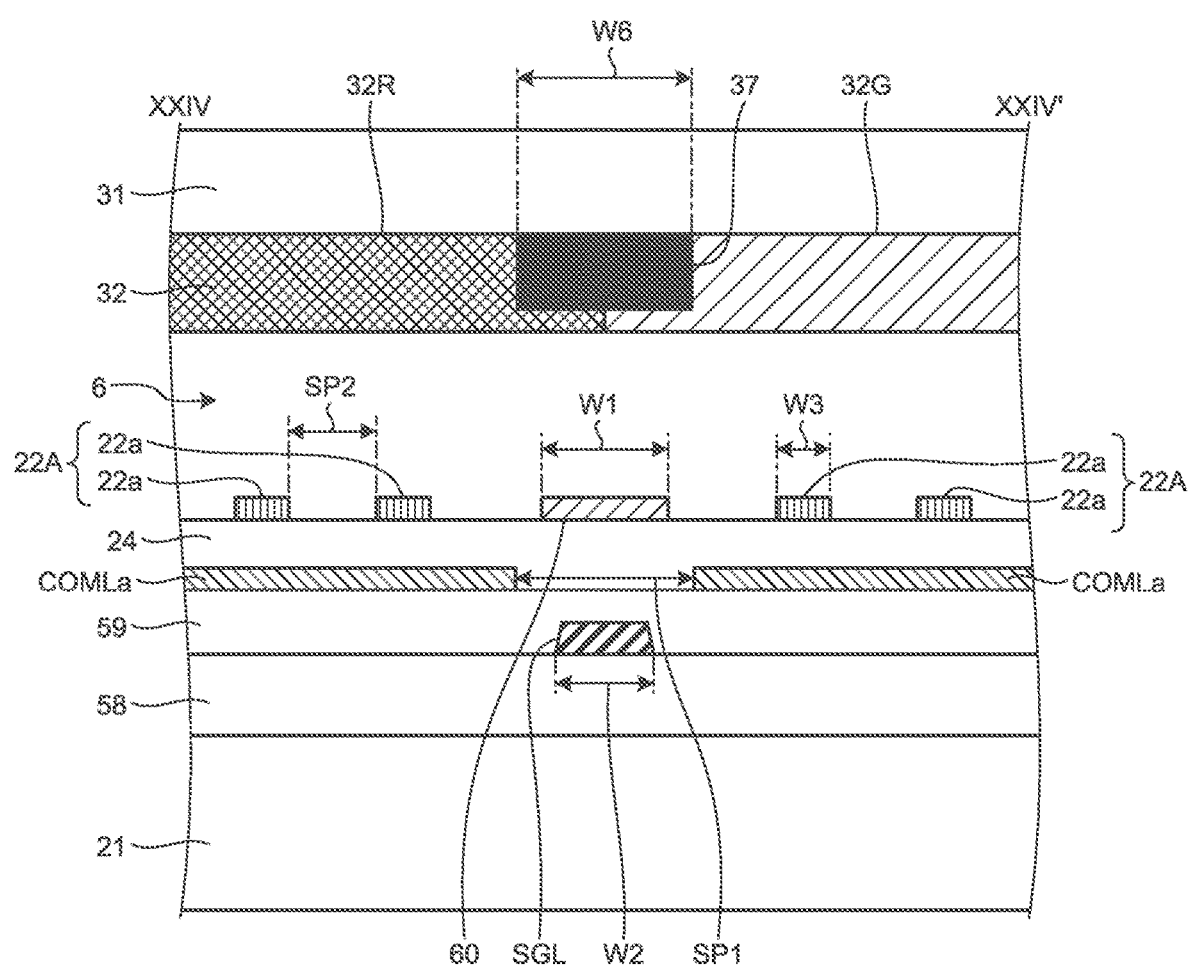
FIG. 24 is a sectional view along line XXIV-XXIV' in FIG. 23.

FIG. 23 is an enlarged plan view of the pixel electrodes according to a fourth embodiment of the present disclosure. FIG. 24 is a sectional view along line XXIV-XXIV' in FIG. 23.

As illustrated in FIG. 23, the signal line SGL is disposed between the first electrodes COMLa provided side by side in the first direction Dx in planar view. A conductive body 60 extends along the signal line SGL between the first electrodes COMLa. In other words, the outer sides of the conductive body 60 are disposed along the outer sides of the signal line SGL in planar view. While FIG. 23 illustrates the sub-pixels SPix arrayed in the first direction Dx, they are also arrayed in the second direction Dy. The conductive body 60 continuously extends along a plurality of sub-pixels SPix arrayed in the second direction Dy.

As illustrated in FIG. 24, the first electrodes COMLa are provided on the signal line SGL with the insulating layer 59 interposed therebetween. The pixel electrodes 22A are provided on the first electrodes COMLa with the insulating layer 24 interposed therebetween. The conductive body 60 is provided to the same layer as that of the pixel electrodes 22A. The conductive body 60 is made of the same material as that of the pixel electrodes 22A, that is, a translucent conductive material, such as ITO. The material is not limited thereto, and the conductive body 60 may be made of a metal material including at least one of Al, Cu, Ag, Mo, and an alloy of these metals.

The conductive body 60 is provided overlapping the signal line SGL. The light-shielding layer 37 is provided overlapping the signal line SGL and the conductive body 60. A width W1 of the conductive body 60 according to the present embodiment is larger than a width W2 of the signal line SGL. The width W1 of the conductive body 60 and the width W2 of the signal line SGL are smaller than a width W6 of the light-shielding layer 37. The width W1 of the conductive body 60 is smaller than a space SP1 between the first electrodes COMLa adjacent to each other. The dimensions of the components illustrated in FIG. 24 are given by way of example only and may be appropriately modified. The width W1 of the conductive body 60 may be smaller than the width W2 of the signal line SGL and for example equal to a width W3 of a strip portion 22a of the pixel electrode 22A. The width W3 of the strip portion 22a is smaller than a space SP2 between the strip portions 22a adjacent to each other.

The width W1 of the conductive body 60, the width W2 of the signal line SGL, the width W3 of the strip portion 22a, and the width W6 of the light-shielding layer 37 are the lengths of the respective members in the first direction Dx (refer to FIG. 23) in planar view. In other words, they are the lengths of the respective members in a direction parallel to the gate lines GCL.

When CDM drive is performed on the first electrodes COMLa, the conductive body 60 according to the present embodiment is brought into a floating state. As a result, the conductive body 60 has an intermediate potential between the drive signal Vcom(+) and the drive signal Vcom(−). Consequently, the present embodiment can reduce the gradient of potential difference between the first electrodes COMLa.

Alternatively, the conductive body 60 is supplied with a voltage signal having an intermediate potential. Specifically, when one of the first electrodes COMLa is supplied with the drive signal Vcom(+), and the other thereof is supplied with the drive signal Vcom(−), the conductive body 60 is supplied with a DC voltage signal having an electric potential of $(V_H+V_L)/2$ corresponding to the intermediate potential between the high level voltage $V_H$ and the low level voltage $V_L$. Consequently, the present embodiment can reduce the gradient of potential difference between the first electrodes COMLa.

Fifth Embodiment

Figure 25:
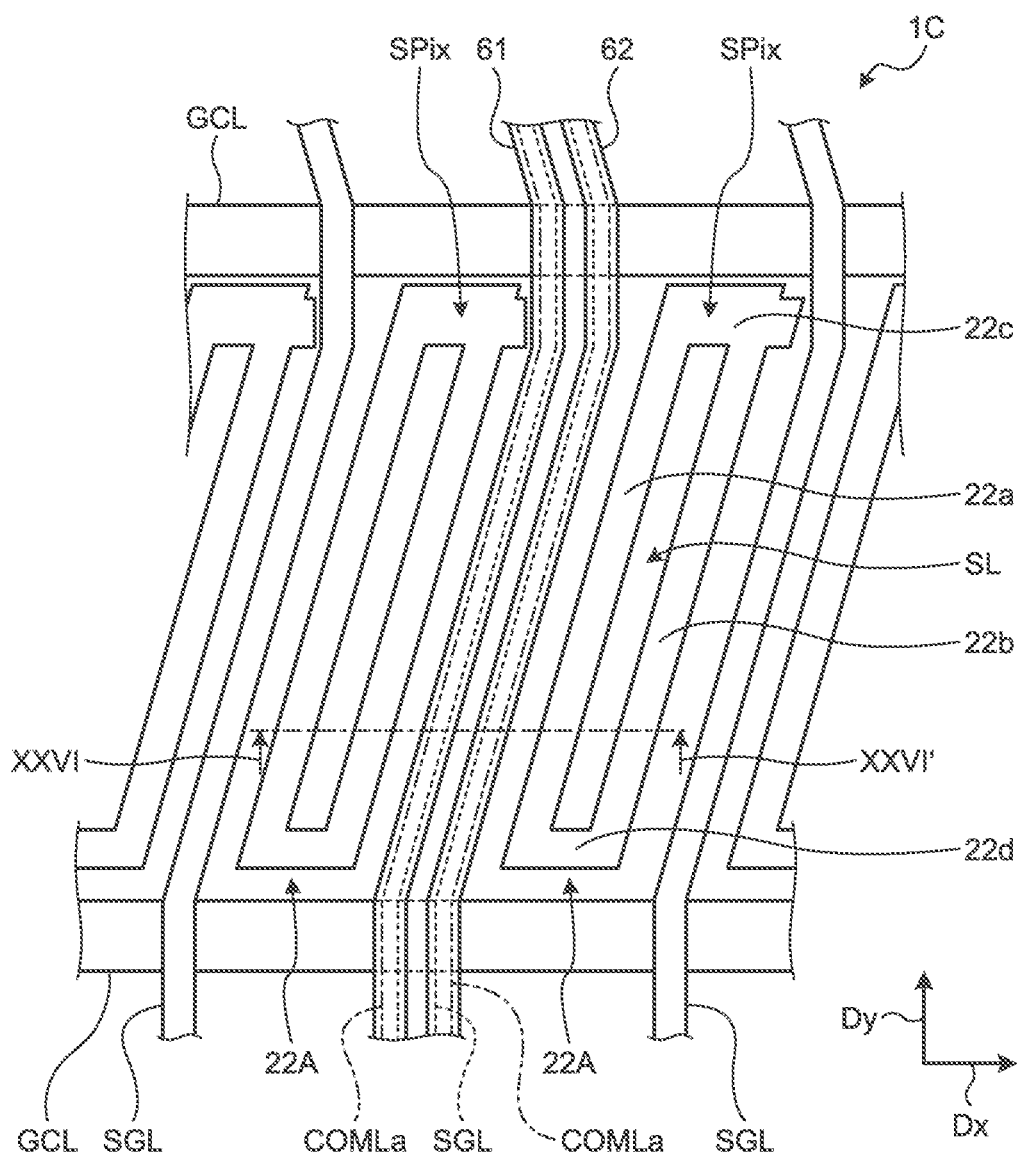
FIG. 25 is an enlarged plan view of the pixel electrodes according to a fifth embodiment of the present disclosure.
Figure 26:
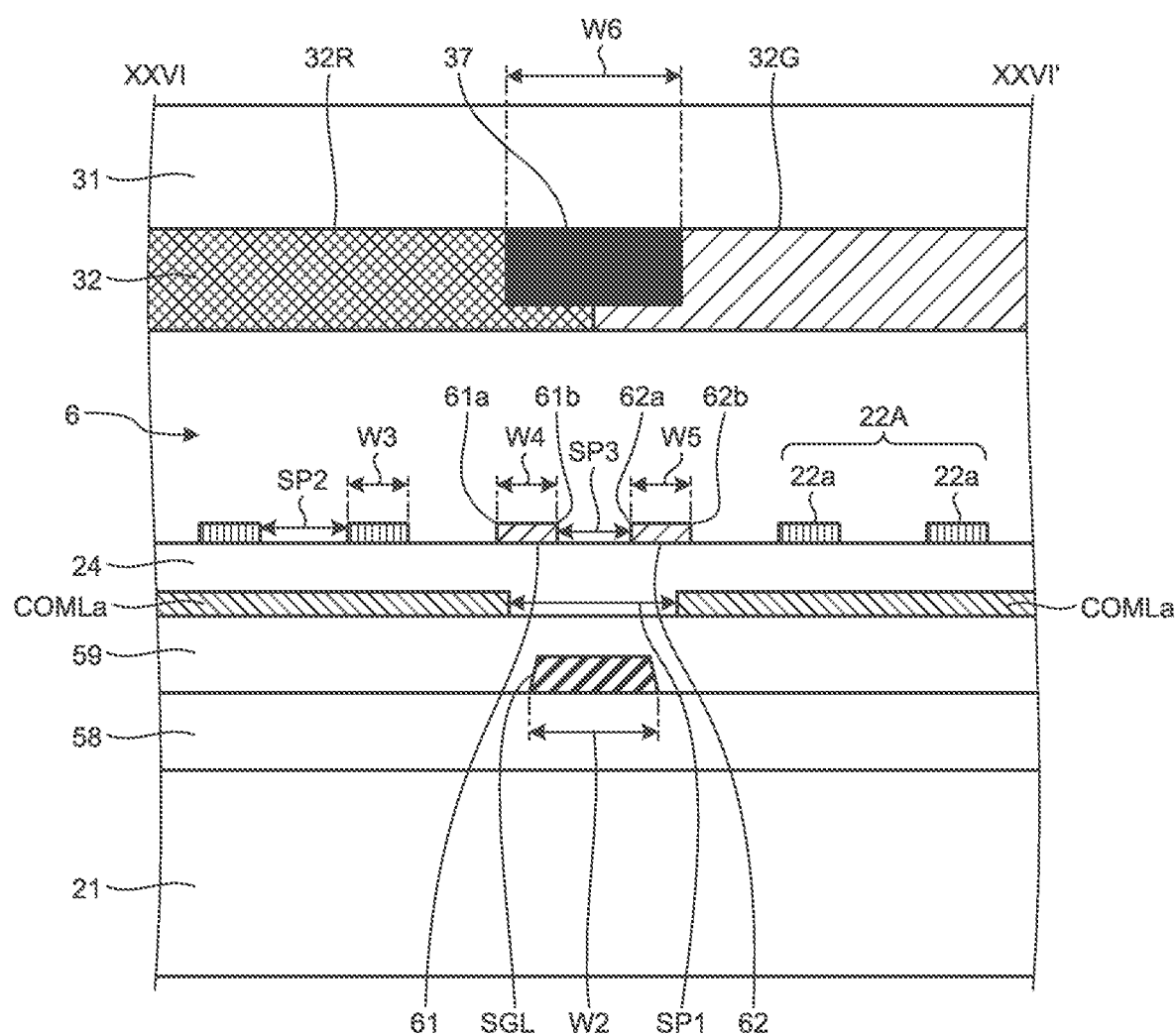
FIG. 26 is a sectional view along line XXVI-XXVI' in FIG. 25.

FIG. 25 is an enlarged plan view of the pixel electrodes according to a fifth embodiment of the present disclosure. FIG. 26 is a sectional view along line XXVI-XXVI' in FIG. 25. As illustrated in FIG. 25, in a display device 1C according to the present embodiment, a first conductive body 61 and a second conductive body 62 are provided between the first electrodes COMLa adjacent to each other. The first conductive body 61 and the second conductive body 62 are zigzag-shaped wires extending along the first electrodes COMLa. The first conductive body 61 and the second conductive body 62 are disposed side by side in the first direction Dx with a space interposed therebetween. The first conductive body 61 and the second conductive body 62 extend along the signal line SGL. In other words, the outer side of the first conductive body 61 is disposed along one side of the signal line SGL in the first direction Dx in planar view. The outer side of the second conductive body 62 is disposed along the other side of the signal line SGL in planar view.

As illustrated in FIG. 26, the first conductive body 61 and the second conductive body 62 are provided to the same layer as that of the pixel electrodes 22A. The first conductive body 61 and the second conductive body 62 are provided above the signal line SGL and the first electrodes COMLa. The first conductive body 61 and the second conductive body 62 are made of the same material as that of the pixel electrodes 22A, that is, a translucent conductive material, such as ITO. The material is not limited thereto, and the first conductive body 61 and the second conductive body 62 may be made of a metal material including at least one of Al, Cu, Ag, Mo, and an alloy of these metals.

Part of the first conductive body 61 according to the present embodiment is disposed overlapping one of the adjacent first electrodes COMLa. Part of the second conductive body 62 is disposed overlapping the other of the adjacent first electrodes COMLa. Specifically, a first end 61a of the first conductive body 61 in the width direction is disposed overlapping the first electrode COMLa. A second end 61b of the first conductive body 61 is disposed overlapping the signal line SGL. A first end 62a of the second conductive body 62 in the width direction is disposed overlapping the signal line SGL. A second end 62b of the second conductive body 62 is disposed overlapping the first electrode COMLa.

As illustrated in FIG. 26, a width W4 of the first conductive body 61 is equal to a width W5 of the second conductive body 62. The width W4 of the first conductive body 61 and the width W5 of the second conductive body 62 are equal to the width W3 of the strip portion 22a of the pixel electrode 22A. The width W4 of the first conductive body 61 may be different from the width W5 of the second conductive body 62. The width W4 of the first conductive body 61 and the width W5 of the second conductive body 62 are smaller than the width W2 of the signal line SGL.

A space SP3 between the first conductive body 61 and the second conductive body 62 is larger than the width W4 of the first conductive body 61 and larger than the width W5 of the second conductive body 62. The space SP3 between the first conductive body 61 and the second conductive body 62 is smaller than the space SP1 between the adjacent first electrodes COMLa and smaller than the width W2 of the signal line SGL. The space SP3 between the first conductive body 61 and the second conductive body 62 is smaller than the space SP2 between the adjacent strip portions 22a.

The total length of the width W4 of the first conductive body 61, the space SP3 between the first conductive body 61 and the second conductive body 62, and the width W5 of the second conductive body 62 is longer than the width W6 of the light-shielding layer 37 and longer than the space SP1 between the adjacent first electrodes COMLa. The dimensions of the components illustrated in FIG. 26 are given by way of example only and may be appropriately modified. The width W4 of the first conductive body 61 and the width W5 of the second conductive body 62, for example, may be different from the width W3 of the strip portion 22a. The total length of the width W4, the space SP3, and the width W5 may be shorter than the width W6 of the light-shielding layer 37 or the space SP1 between the adjacent first electrodes COMLa.

When CDM drive is performed on the first electrodes COMLa, the first conductive body 61 and the second conductive body 62 according to the present embodiment are supplied with voltage signals having intermediate potentials between the drive signals Vcom supplied to the adjacent first electrodes COMLa. The first conductive body 61 is supplied with a voltage signal having a first intermediate potential. The second conductive body 62 is supplied with a voltage signal having a second intermediate potential. The first intermediate potential is different from the second intermediate potential.

By setting the first intermediate potential and the second intermediate potential to appropriate values, the present embodiment can reduce the potential difference between the members. In other words, the first intermediate potential and the second intermediate potential are set such that the potential difference between the first electrode COMLa and the first conductive body 61, the potential difference between the first conductive body 61 and the second conductive body 62, and the potential difference between the second conductive body 62 and the first electrode COMLa are close to one another. Consequently, the present embodiment can reduce the gradient of potential difference between the adjacent first electrodes COMLa.

Specifically, let us assume a case where one of the first electrodes COMLa is supplied with 0.0 V as the low level voltage $V_L$, and the other thereof is supplied with 3.5 V as the high level voltage $V_H$, for example. In this case, the first conductive body 61 overlapping one of the first electrodes COMLa is supplied with a voltage signal of 1.0 V, for example. The second conductive body 62 overlapping the other of the first electrodes COMLa is supplied with a voltage signal of 2.5 V, for example. The first intermediate potential is 1.0 V, and the second intermediate potential is 2.5 V. With this setting, the potential difference between one of the first electrodes COMLa and the first conductive body 61 is substantially equal to that between the other of the first electrodes COMLa and the second conductive body 62. As described above, the display device 1C according to the present embodiment includes the first conductive body 61 and the second conductive body 62. With this configuration, the present embodiment can increase the detection sensitivity by CDM drive and perform high quality display.

In CDM drive, the first conductive body 61 and the second conductive body 62 may be brought into a floating state. In this case, the first conductive body 61 is driven at the same electric potential as that of one of the first electrode COMLa, and the second conductive body 62 is driven at the same electric potential as that of the other of the first electrode COMLa. In other words, the potential difference between the first conductive body 61 and the second conductive body 62 increases. Also in this case, the space between the first conductive body 61 and the second conductive body 62 is positioned under the light-shielding layer 37. Consequently, the present embodiment can suppress light leakage and perform high quality display.

Sixth Embodiment

Figure 27:
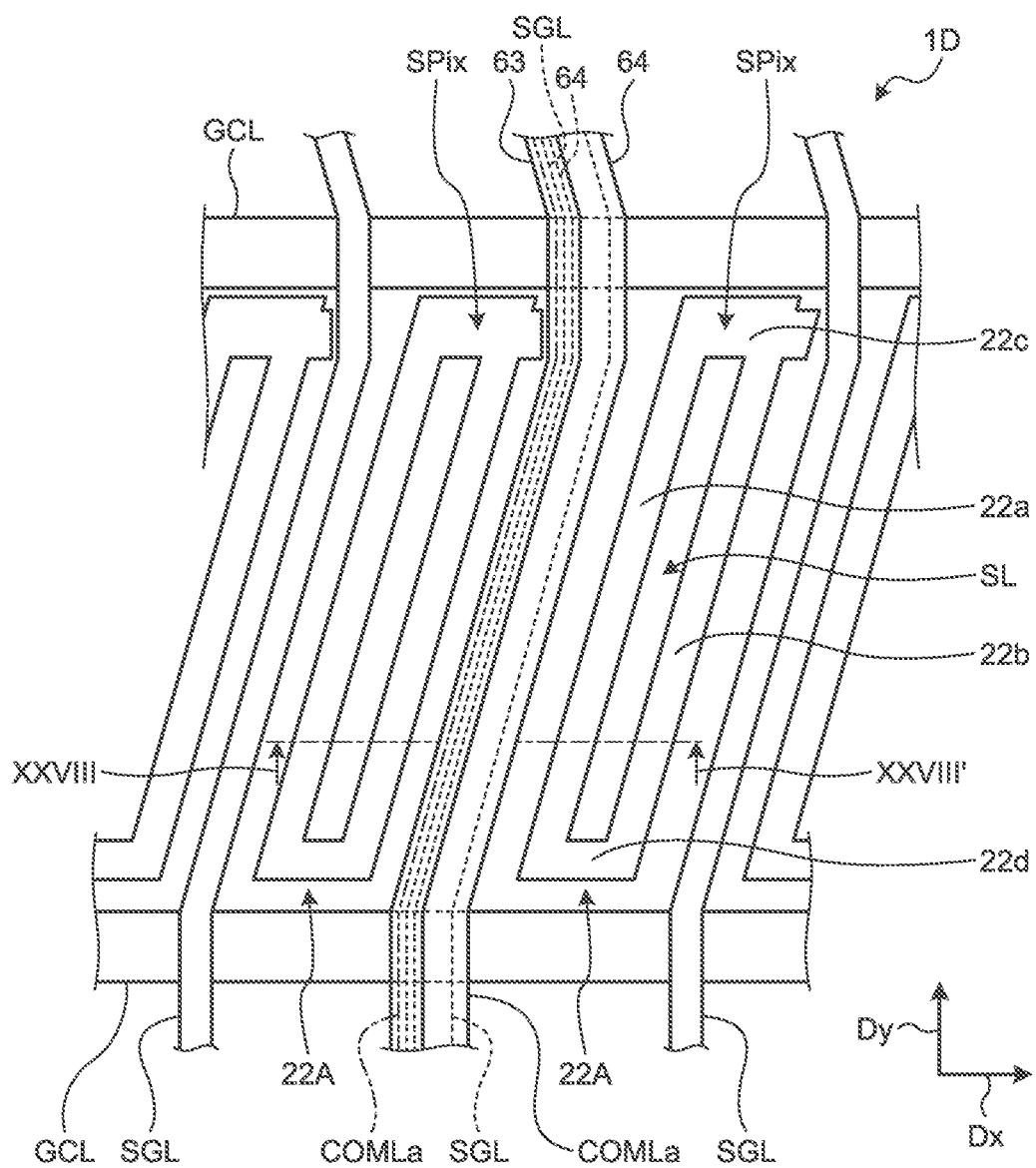
FIG. 27 is an enlarged plan view of the pixel electrodes according to a sixth embodiment of the present disclosure.
Figure 28:
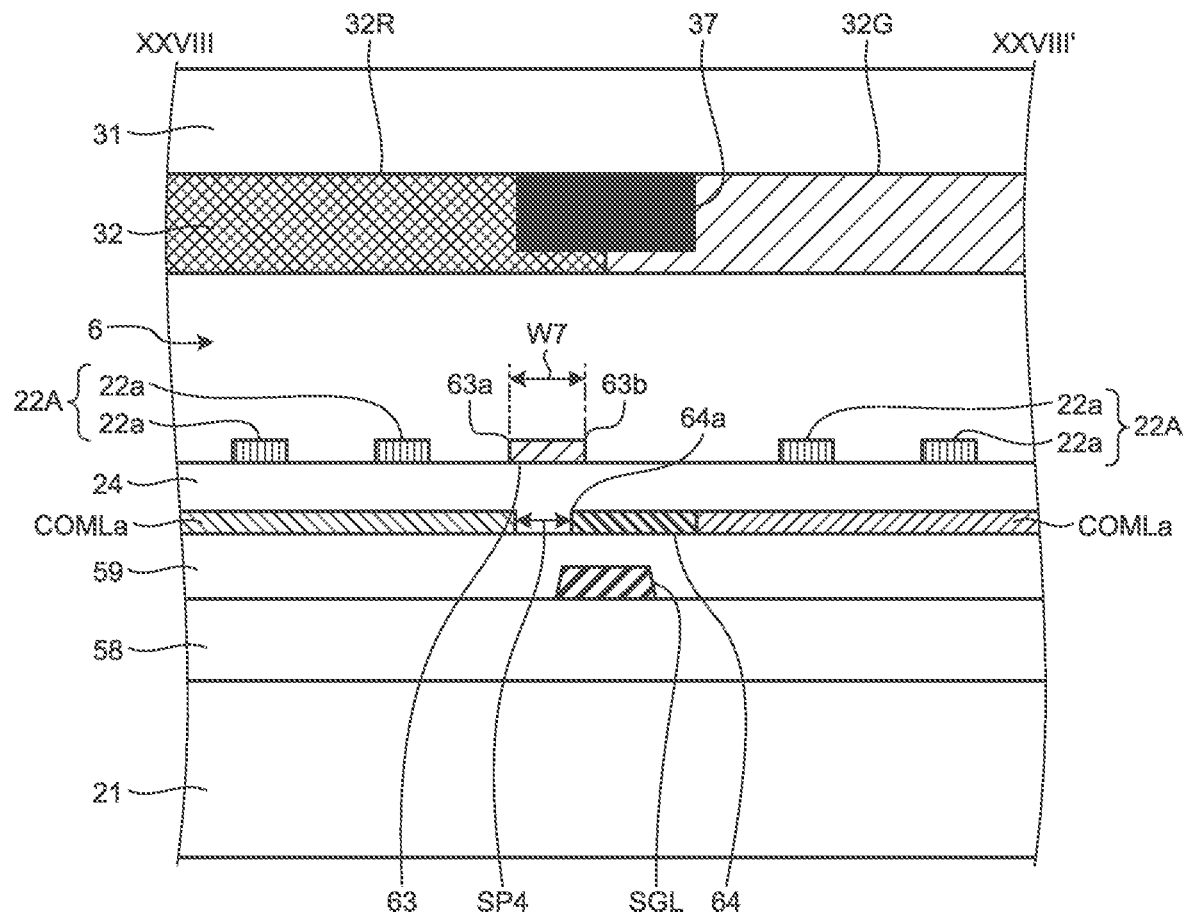
FIG. 28 is a sectional view along line XXVIII-XXVIII' in FIG. 27.

FIG. 27 is an enlarged plan view of the pixel electrodes according to a sixth embodiment of the present disclosure. FIG. 28 is a sectional view along line XXVIII-XXVIII' in FIG. 27. As illustrated in FIG. 27, in a display device 1D according to the present embodiment, a third conductive body 63 and a fourth conductive body 64 are provided between the first electrodes COMLa adjacent to each other. The third conductive body 63 and the fourth conductive body 64 are zigzag-shaped wires extending along the first electrodes COMLa. The first conductive body 61 and the second conductive body 62 extend along the signal line SGL.

As illustrated in FIG. 28, the third conductive body 63 and the fourth conductive body 64 are provided to different layers. The third conductive body 63 is provided to the same layer as that of the pixel electrodes 22A. The fourth conductive body 64 is provided to the same layer as that of the first electrodes COMLa. In other words, the fourth conductive body 64 is provided above the signal line SGL. The third conductive body 63 is provided above the first electrodes COMLa and the fourth conductive body 64.

The third conductive body 63 is made of the same material as that of the pixel electrodes 22A, that is, a translucent conductive material, such as ITO. The fourth conductive body 64 is made of a metal material including at least one of Al, Cu, Ag, Mo, and an alloy of these metals.

The fourth conductive body 64 is in contact with an end of the first electrode COMLa, thereby being electrically coupled thereto. An end 64a of the fourth conductive body 64 in the width direction is provided at a position overlapping the signal line SGL. The end 64a of the fourth conductive body 64 is opposite to the end in contact with the first electrode COMLa. The fourth conductive body 64 may be disposed overlapping part of the first electrode COMLa. The use of the metal material described above for the fourth conductive body 64 can reduce the resistance of the first electrodes COMLa, thereby improving the responsiveness in touch detection.

A first end 63a of the third conductive body 63 in the width direction is disposed overlapping the first electrode COMLa. A second end 63b of the third conductive body 63 is disposed overlapping the fourth conductive body 64. A width W7 of the third conductive body 63 is larger than a space SP4 between the first electrode COMLa and the fourth conductive body 64. The area in which the third conductive body 63 overlaps the fourth conductive body 64 according to the present embodiment, that is, the area between the end 63b of the third conductive body 63 and the end 64a of the fourth conductive body 64 is positioned under the light-shielding layer 37.

When CDM drive is performed on the first electrodes COMLa, the third conductive body 63 according to the present embodiment is supplied with a voltage signal having an intermediate potential between the drive signals Vcom supplied to the adjacent first electrodes COMLa. Let us assume a case where one of the first electrodes COMLa is supplied with 0.0 V as the low level voltage $V_L$, and the other thereof is supplied with 3.5 V as the high level voltage $V_H$, for example. In this case, the third conductive body 63 is supplied with a voltage signal of 1.0 V, for example. By contrast, the fourth conductive body 64 is in contact with the first electrode COMLa. As a result, the fourth conductive body 64 is driven at the same electric potential as that of the drive signal Vcom supplied to the first electrode COMLa.

The third conductive body 63 according to the present embodiment is supplied with a voltage signal having an intermediate potential. Consequently, the present embodiment can reduce the gradient of potential difference between the adjacent first electrodes COMLa. The fourth conductive body 64 is coupled to the first electrode COMLa and provided under the light-shielding layer 37. With this configuration, if the potential difference between the third conductive body 63 and the fourth conductive body 64 increases, the present embodiment can suppress light leakage and perform high quality display.

Seventh Embodiment

Figure 29:
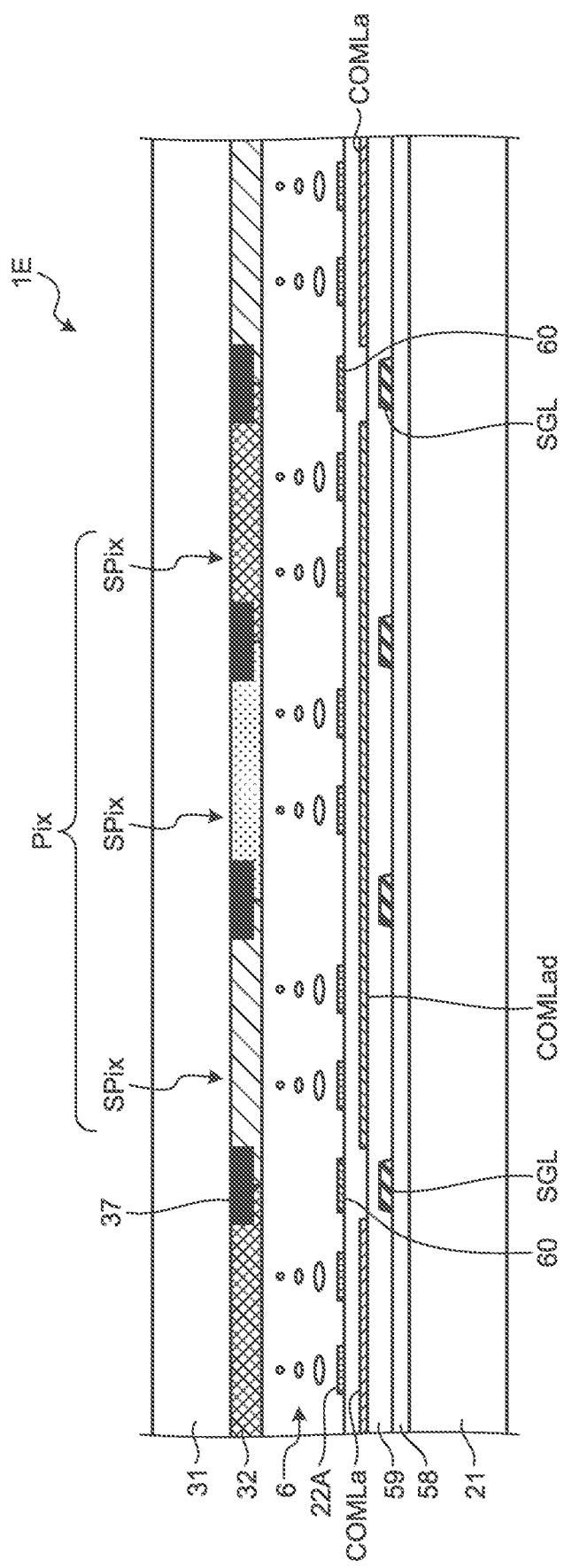
FIG. 29 is a sectional view of the display device according to a seventh embodiment of the present disclosure.

FIG. 29 is a sectional view of the display device according to a seventh embodiment of the present disclosure. As illustrated in FIG. 29, a display device 1E according to the present embodiment includes the third electrodes COMLad and the conductive bodies 60. The third electrode COMLad has the same configuration as that of the second embodiment. The conductive bodies 60 have the same configuration as that of the fourth embodiment.

As illustrated in FIG. 29, the third electrode COMLad is provided between two first electrodes COMLa in the same layer as that of the first electrodes COMLa. The signal line SGL is disposed between the first electrode COMLa and the third electrode COMLad. The third electrode COMLad according to the present embodiment has a width of one pixel Pix including three sub-pixels SPix. In other words, the third electrode COMLad is provided under the three color areas 32R, 32G, and 32B of the color filter 32.

The conductive body 60 is provided between the first electrode COMLa and the third electrode COMLad adjacent to each other. The conductive body 60 according to the present embodiment is provided between the third electrode COMLad and the first electrode COMLa adjacent to one side of the third electrode COMLad. The conductive body 60 is also provided between the third electrode COMLad and the first electrode COMLa adjacent to the other side of the third electrode COMLad. In other words, two conductive bodies 60 are provided between the first electrodes COMLa adjacent to each other across the third electrode COMLad.

The conductive bodies 60 are provided to the same layer as that of the pixel electrodes 22A. In other words, the conductive bodies 60 are provided above the first electrodes COMLa and the third electrode COMLad. The conductive bodies 60 are disposed overlapping the respective signal lines SGL.

The third electrodes COMLad and the conductive bodies 60 are driven in the same manner as that in the example described above in touch detection by CDM drive. In touch detection by CDM drive, the third electrodes COMLad are brought into a floating state. The conductive bodies 60 are supplied with a voltage signal having an intermediate potential. Two conductive bodies 60 according to the present embodiment are provided between the first electrodes COMLa adjacent to each other across the third electrode COMLad. The two conductive bodies 60 may be supplied with voltage signals having different intermediate potentials.

The third electrodes COMLad and the conductive bodies 60 according to the present embodiment serve as a conductive body that reduces the gradient of potential difference between the first electrodes COMLa. As a result, electric fields generated between the first electrodes COMLa are reduced. Consequently, the display device 1E can suppress movement of the liquid crystal molecules in the liquid crystal layer 6, thereby performing high quality display.

The configuration is not limited to that in the example illustrated in FIG. 29. Besides the third electrode COMLad provided between the first electrodes COMLa, the display device 1E may include the first conductive body 61 and the second conductive body 62 according to the fifth embodiment or the third conductive body 63 and the fourth conductive body 64 according to the sixth embodiment between the third electrode COMLad and the first electrodes COMLa, for example.

While exemplary embodiments according to the present invention have been described, the embodiments are not intended to limit the invention. The contents disclosed in the embodiments are given by way of example only, and various changes may be made without departing from the spirit of the invention. Appropriate changes made without departing from the spirit of the invention naturally fall within the scope of the invention. At least one of various omissions, substitutions, and changes of the components may be made without departing from the spirit of the embodiments above and the modifications thereof.

The shapes of the first electrodes COML, the second electrodes TDL, the third electrodes COMLd, and other components according to the embodiments are given by way of example only and may be appropriately modified. The configuration of the pixel electrodes 22A and 22B and the array of the pixels Pix are not limited to those illustrated in FIGS. 18 and 19 and other figures. The pixel electrodes 22A and 22B may have another shape, and the pixels Pix are disposed in another pixel array.

What is claimed is:
1. A display device comprising:
   a first substrate;
   a second substrate facing the first substrate;
   a display functional layer provided between the first substrate and the second substrate;
   a plurality of first electrodes provided between the first substrate and the second substrate;
   a plurality of conductive bodies disposed in such a manner that a conductive body and a first electrode are disposed alternately in a direction the first electrodes are arranged, a width of the respective conductive bodies being smaller than a width of the respective first electrodes;
   a plurality of pixel electrodes facing the first electrodes between the first substrate and the second substrate;
   a drive circuit configured to supply:
      drive signals to the first electrodes in detection periods; and
      supply a common signal to both of the first electrodes and the conductive bodies in display periods, and
   wherein
   in one of the detection periods, the drive circuit supplies a first potential to one of the first electrodes and a second potential different from the first electric potential to the other of the first electrodes simultaneously, the conductive bodies being in a floating state, and
   in the display periods, the drive circuit supplies the common signal to the first electrodes and the conductive bodies simultaneously.

2. The display device according to claim 1, further comprising:
   switching elements provided corresponding to the respective pixel electrodes; and
   a signal line coupled to the switching elements, wherein one of the conductive bodies overlaps the signal line in plan view.

3. The display device according to claim 2, further comprising a light shielding line overlapping the signal line and the one of the conductive bodies, wherein
   a width of the signal line is less than the width of the one of the conductive bodies.

4. The display device according to claim 2, wherein
   the one of the conductive bodies includes a first conductive body and a second conductive body adjacent to the first conductive body with a gap interposed therebetween, and
   the gap is smaller than a space between the first conductive body and the first electrodes provided side by side in plan view.

5. The display device according to claim 4, wherein
   the signal line has a first side and a second side along a longitudinal direction of the signal line,
   the first conductive body is disposed overlapping a first end of the signal line, and the second conductive body is disposed overlapping a second end of the signal line.

6. The display device according to claim 5, further comprising a light shielding line overlapping the signal line and the one of the conductive bodies, wherein
a width of the signal line is greater than a width of each of the first conductive body and the second conductive body, and
one edge of the light shielding line overlaps the first conductive body and the other edge of the light shielding line overlaps the second conductive body.

7. The display device according to claim 2, further comprises a conductive portion that is in contact with one of the first electrodes,
the signal line has a first side and a second side along a longitudinal direction of the signal line,
the one of the conductive bodies overlaps the first side of the signal line, and
the conductive portion overlaps the second side of the signal line.

8. The display device according to claim 7, further comprising a light shielding line overlapping the signal line, the one of the conductive bodies, and the conductive portion.

9. The display device according to claim 1, wherein one of the conductive bodies includes:
a first conductive body provided to the same layer as a layer of the pixel electrodes; and a second conductive body provided to the same layer as a layer of the first electrodes.

10. The display device according to claim 9, further comprising a light shielding line overlapping the signal line, the first conductive body, and the second conductive body.

11. The display device according to claim 1, wherein
the conductive bodies are disposed in a layer of the first electrodes, and
the pixel electrodes face one of the conductive bodies.

12. The display device according to claim 11, further comprising:
switching elements provided corresponding to the respective pixel electrodes; and
a signal line coupled to the switching elements, wherein
one of the conductive bodies overlaps a plurality of the signal lines in plan view.

13. The display device according to claim 11, wherein
one of the conductive bodies includes a first conductive body and a second conductive body adjacent to the first conductive body with a gap interposed therebetween.

14. The display device according to claim 11, further comprising
a plurality of signal lines; and
a plurality of light shielding lines overlapping the signal lines, wherein
the conductive bodies are disposed between the light shielding lines and the signal lines in a vertical direction perpendicular to the first substrate.

15. The display device according to claim 14, further comprising a plurality of color filters provided between the light shielding lines in plan view and overlapping the conductive body in the vertical direction.

16. The display device according to claim 11, further comprising a signal line disposed between one of the first electrodes and one of the conductive bodies in plan view.

* * * * *